(12) United States Patent
Hamada et al.

(10) Patent No.: US 6,668,227 B2
(45) Date of Patent: Dec. 23, 2003

(54) NAVIGATION APPARATUS

(75) Inventors: Hiroyuki Hamada, Yawata (JP); Yuji Hamada, Setagaya-ku (JP); Kiyomi Sakamoto, Ikoma (JP); Atsushi Yamashita, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/409,115

(22) Filed: Apr. 9, 2003

(65) Prior Publication Data

US 2003/0195700 A1 Oct. 16, 2003

(30) Foreign Application Priority Data

Apr. 10, 2002 (JP) ........................ 2002-107753

(51) Int. Cl.[7] .............................................. G01C 21/30
(52) U.S. Cl. ...................... 701/208; 701/213; 701/209; 340/990
(58) Field of Search ................................. 701/201–213; 345/419, 425, 433, 427, 421; 340/989, 990, 995.1, 995.14, 995.24

(56) References Cited

U.S. PATENT DOCUMENTS 6,574,553 B1 * 6/2003 Beesley et al. ............. 701/201
6,591,190 B2 * 7/2003 Nishida et al. ............. 701/211
6,611,753 B1 * 8/2003 Millington .................. 701/209

FOREIGN PATENT DOCUMENTS

| JP | 5-197338 | 8/1993 |
|---|---|---|
| JP | 11-132777 | 5/1999 |
| JP | 3196970 | 6/2001 |

* cited by examiner

Primary Examiner—Richard M. Camby
(74) Attorney, Agent, or Firm—Wenderoth, Lind & Ponack, L.L.P.

(57) ABSTRACT

There is provided a navigation apparatus which displays information concerning facilities or the like which are present in a broad range ahead of a user. An information processing section 4 of a navigation apparatus identifies a facility type to be displayed. Next, a predicted road along which a user is expected to travel is determined, and a reference intersection is selected from among the intersections on the predicted road. The information processing section 4 computes a network of roads beginning from the selected reference intersection, and acquires facility information in the neighborhood thereof. Furthermore, the information processing section 4 generates facility information image data for displaying the acquired facility information on a map.

23 Claims, 17 Drawing Sheets

NAVIGATION APPARATUS

BACKGROUND OF THE INVENTION

1. Field of the Invention

The present invention relates to a navigation apparatus, and more particularly to a navigation apparatus which displays a map together with information concerning facilities and the like around a user's location.

2. Description of the Background Art

A primary purpose of a navigation apparatus is to compute a route to a destination and display the computed route. Some navigation apparatuses display, together with the computed route to the destination, various information which is useful for the user. For example, a navigation apparatus has been proposed which displays various facilities (e.g., gas stations, restaurants, and the like) which are in the neighborhood of the current location of a vehicle incorporating the navigation apparatus (hereinafter simply referred to as "the vehicle"). In the following description, information on facilities which are in the neighborhood of the vehicle, as displayed by the navigation apparatus, will be referred to as "facility information".

One example of a conventional navigation apparatus capable of displaying the aforementioned facility information computes a distance (or the like) from a current location to each facility which is present along a predetermined road, and generates a table containing information concerning such facilities. FIG. 22 shows an exemplary image displayed by such a navigation apparatus. As shown in FIG. 22, the following information is displayed: facilities (e.g., C1, R1, and G1) which are present along a predetermined road, distances (e.g., 2 km, 3 km, and 5 km) to the facilities, and which side of the road each facility is located. Thus, with respect to facilities which are present along the predetermined road, the user can easily ascertain their locations, distances thereto, and the like.

Another example of a conventional navigation apparatus looks for, when a route has been set, facilities which are present within a certain distance from the route, and displays information concerning such facilities. The user is thus enabled to easily obtain information concerning facilities in the neighborhood of the route.

As described above, the conventional technique which displays the exemplary image as shown in FIG. 22 displays information concerning facilities present along a predetermined road. However, this technique only makes it possible to obtain information concerning facilities which are present along the predetermined road. No facility information can be obtained for any roads other than the predetermined road, even for roads which lie generally in the traveling direction of the vehicle. Therefore, the user cannot obtain facility information concerning any other roads branching from the predetermined road. For example, if the user wishes to visit a gas station while traveling along a route to a destination, the navigation apparatus will not display any gas station information unless there is a gas station which is along the route to the destination. Therefore, the user cannot obtain information on any gas station which is located along a road branching off from the route to the destination.

The other conventional technique which looks for facilities which are present within a certain distance from the route and displays screen information on the found facilities as a separate image allows the user to know the existence of facilities which are in the neighborhood of the route. However, with this technique, it is impossible for the user to obtain detailed information concerning the facilities, e.g., which intersection to turn in order to arrive at a facility, or the travel distance and estimated travel time before arriving at the facility. Moreover, this technique assumes that a route has been set, so that it is impossible to look for such facilities unless a route has been set.

Thus, the above-described two conventional techniques, which display information related to a preselected road or the neighborhood thereof, the user may not necessarily be able to obtain sufficient information concerning facilities lying ahead of the user along his/her traveling path.

SUMMARY OF THE INVENTION

Therefore, an object of the present invention is to provide a navigation apparatus which provides a user with information concerning facilities or the like which are present in a broad range ahead of the user, such information being displayed in a comprehensible manner.

The present invention has the following features to attain the object mentioned above.

A first aspect of the present invention is directed to a navigation apparatus for displaying a road map on a screen of a display device, comprising a map data storage section, a moving state acquisition section, a reference intersection selection section, a point information acquisition section, and a map displaying section. The map data storage section stores map data including point information concerning points on the map. The moving state acquisition section acquires a location and a traveling direction of a user. The reference intersection selection section selects, from among intersections displayed on the screen, at least one intersection included in a network of roads extending from the location of the user in the traveling direction as a reference intersection. As used herein, the location of a user is a notion which encompasses a virtual location of the user, as well as the current location of the user. The point information acquisition section acquires, from the map data storage section, point information concerning a point near a road in a network of roads extending beyond a reference road as seen from the reference intersection, wherein the reference road is a road which is connected to the reference intersection but does not extend toward the location of the user from the reference intersection. Alternatively, roads extending toward the current location from the reference intersection may also be designated as reference roads. The map displaying section displays the road map, and displays the point information acquired by the point information acquisition section so as to appear associated with the reference road associated with the point information.

According to the first aspect, point information concerning a point existing beyond an intersection located ahead of the user (reference intersection) is displayed so as to appear associated with a road connected to the intersection (reference road) (see FIG. 10). As used herein, the "point information" is information concerning a point on the map, and is a notion encompassing facility information concerning facilities and information such as names of places. Thus, the user can immediately understand what lies beyond each road connected to an intersection which is located ahead of the user. In other words, with respect to each piece of point information displayed on the screen, the user can immediately understand which way to turn at which intersection. Since it is possible to display point information for a plurality of roads connected to a reference intersection, the user can obtain point information concerning points in a broad area range ahead of the user.

In the first aspect, the navigation apparatus may further comprise a network computation section for computing a search network, wherein the search network is the network of roads extending beyond the reference road as seen from the reference intersection, wherein, the point information acquisition section acquires point information concerning a point near a road in the search network as the point information associated with the reference road.

In the first aspect, the network computation section may select only a predetermined category of roads in the map data for the search network. Thus, a search network composed only of major roads such as national and/or prefectural roads can be defined. In this case, only the point information concerning points which are present near major roads is displayed on the display device. Since the user is generally believed not to travel along roads other than the major roads in unfamiliar places, displaying only point information near the major roads can provide a sufficient advantage in displaying point information over a broad range. By excluding roads other than the major roads from the search network, the search network computation process can be simplified. As a result, the processing time need to display point information can be reduced.

In the first aspect, the point information acquisition section may comprise a condition checking section for determining, if point information is redundantly acquired as a result of acquiring point information associated with a plurality of said reference roads, whether or not each of the plurality of reference roads associated with the point information which has been redundantly acquired satisfies a predetermined condition based on the search network, and the map displaying section may display the point information redundantly acquired by the point information acquisition section so as to appear associated with those reference roads which are determined by the condition checking section as satisfying the predetermined condition.

Thus, even if the same point information is redundantly acquired, not all of the acquired pieces of point information are displayed. In a method where point information is acquired by using a search network, especially in the case where there are a plurality of reference intersections, the same point information may be redundantly acquired, so that the point information concerning the same point may be displayed in connection with a plurality of reference roads, thus making it difficult for the user to judge which reference road the user should choose to arrive at the point. Conversely, by ensuring that the point information is displayed only in connection with reference roads which satisfy the predetermined condition, it becomes possible to reduce the number of pieces of point information displayed on the screen, thus facilitating the judgement by the user. Since unnecessary point information is not displayed, the displayed image on the screen is easier to see.

The predetermined condition may be a condition concerning the distance of a path from the reference intersection to a point represented by the point information via the reference road, and the condition checking section may determine, by computing the distance with respect to each of the plurality of reference roads using the search network, whether each of the plurality of reference roads satisfies the predetermined condition or not. Thus, assuming that the predetermined condition stipulates "a reference road included in a path which constitutes the smallest distance from a reference intersection to a point", for example, point information is displayed only with respect to reference roads included in a path which constitutes the smallest distance from the reference intersection to the point, so that no point information is displayed with respect to the other unnecessary reference roads. As a result, the user can know the shortest path to the point without having to choose from a number of reference roads to take.

The predetermined condition may be a condition concerning an estimated travel time for a path from the reference intersection to the point represented by the point information via the reference road, and the condition checking section may determine, by computing the estimated travel time for each of the plurality of reference roads using the search network, whether each of the plurality of reference roads satisfies the predetermined condition or not. Thus, assuming that the predetermined condition stipulates "a reference road included in a path which imposes the shortest estimated travel time from a reference intersection to a point", for example, point information is displayed only with respect to reference roads included in a path which imposes the shortest estimated travel time from the reference intersection to the point, so that no point information is displayed with respect to the other unnecessary reference roads. As a result, the user can know the least time-consuming path to the point without having to choose from a number of reference roads to take.

In the case where the condition checking section is comprised, the navigation apparatus may further comprise a road history storage section for storing a history of roads traveled along in the past, wherein, the predetermined condition is a condition concerning the history of roads, and the condition checking section determines whether each of the plurality of said reference roads satisfies the predetermined condition, based on a relationship between the search network and history of roads stored in the road history storage section.

Thus, point information is displayed only with respect to reference roads included in a path which includes roads which has previously been traveled along, so that no point information is displayed with respect to the other reference roads. There is a relatively low possibility for the user to get lost on a road which the user has traveled along before, and thus a relatively low possibility for missing a desired point. Therefore, by displaying point information only with respect to reference roads which have previously been traveled along, it becomes possible to exclusively display paths which are of high necessity to the user (i.e., highly likely to be selected by the user).

In the first aspect, the map data storage section may store map data in which each piece of the point information is associated with a road near the point corresponding to the piece of the point information, and the point information acquisition section may acquire the point information associated with the road in the map data as the point information concerning the point near the road.

Thus, it is possible to acquire point information by referring to the roads associated therewith, thereby facilitating the acquisition of point information concerning points in the neighborhood of the network of roads.

In the first aspect, the map data storage section may store map data including location information of the points, and the point information acquisition section may acquire point information concerning a point such that the distance between one of the roads in the search network and the point is equal to or less than a predetermined distance as the point information concerning the point near the road.

Thus, by using location information of points, point information for points which are included in the network of roads can be identified as the point information to be acquired. In this case, without the need to prepare map data in which point information is associated with roads, it is possible to acquire point information concerning points in the neighborhood of the network of roads.

In the first aspect, the navigation apparatus may further comprise a predicted road determination section for determining a predicted road from among the roads displayed on the screen, the predicted road being a road which the user is expected to travel along, wherein the reference intersection selection section selects the reference intersection from among intersections on the predicted road.

In the case where the predicted road determination section is comprised, the predicted road determination section may determine a route from a start point to a destination as the predicted road. Thus, a route to a destination is used as the predicted road, so that it is possible to accurately determine the road which is expected to be traveled along by the user.

In the case where the predicted road determination section is comprised, based on the location and the traveling direction of the user, the predicted road determination section may determine a road which lies in the traveling direction of the user and belongs to a predetermined road category as the predicted road. Thus, a major road such as a national or prefectural road can be used as a predicted road. In general, there is a higher expectation for the user to travel along major roads than lesser roads. Therefore, even in the case where no route has been selected, it is still possible to predict a road which the user is expected to travel along by determining a predicted road based on a predetermined road category.

In the case where the predicted road determination section is comprised, based on the location and the traveling direction of the user, the reference intersection selection section may determine an intersection on the predicted road that is closest to the location of the user as the reference intersection. There is a very high likelihood for the user to travel along an intersection on the predicted road that is closest to the current location. Therefore, by selecting such an intersection as the reference intersection, it becomes possible to display point information which is useful to the user.

In the case where the predicted road determination section is comprised, the reference intersection selection section may select as the reference intersection an intersection which is on the predicted road and at which a road belonging to a predetermined category connects to the predicted road. Thus, an intersection at which the predicted road connects to a road of a predetermined category, e.g., a major road such as a national or prefectural road is selected as the reference intersection. Since there is generally a high likelihood for the user to travel along a major road such as a national or prefectural road, it is also considered highly likely for the user to turn at an intersection which connects to such a major road. Therefore, by selecting such an intersection as the reference intersection, it becomes possible to display point information which is useful to the user.

In the case where the predicted road determination section is comprised, the navigation apparatus may further comprise a road history storage section for storing a history of roads traveled along in the past, wherein, based on the history of roads stored in the road history storage section, the reference intersection selection section selects as the reference intersection an intersection which is on the predicted road and at which a road stored in the road history storage section connects to the predicted road. Thus, an intersection at which the predicted road connects to a road which has previously been traveled along is selected as the reference intersection. It is also considered highly likely for the user to travel along a road which the user has previously traveled along. Therefore, by selecting such an intersection as the reference intersection, it becomes possible to display point information which is useful to the user.

In the first aspect, the point information acquisition section may acquire, from among the point information included in the map data, only a predetermined type of point information.

Thus, only a predetermined type of point information is displayed. Therefore, by setting the type of information to be displayed based on a certain condition (e.g., by allowing the user to preset the type of information in advance), it becomes possible to selectively display a desired type of information.

In the first aspect, the map displaying section may display the point information in an arrow shape oriented in an opposite direction from the reference intersection. Thus, the traveling direction can be indicated to the user. Moreover, the point information acquisition section may acquire a plurality of pieces of point information of different types, and the map displaying section may display the point information in different shapes depending on the types of point information. Thus, the user can easily grasp different types of point information.

A second aspect of the present invention is directed to a point information displaying method for displaying point information on a road map displayed on a screen of a display device, comprising the steps of: selecting, from among intersections displayed on the screen, at least one intersection included in a network of roads extending from a location of a user in a traveling direction of the user as a reference intersection, designating, as a reference road, a road which is connected to the reference intersection but does not extend toward the location of the user from the reference intersection; and displaying point information concerning a point near a road in a network of roads extending beyond the reference road as seen from the reference intersection so as to appear associated with the reference road. Alternatively, roads extending toward the current location from the reference intersection may also be designated as reference roads. By the above method, effects similar to those obtained according to the first aspect can be obtained.

A third aspect of the present invention is directed to a program for causing a computer to display a road map on a screen of a display device, wherein the computer stores map data including point information concerning points on the map, the method comprising: a moving state acquisition step of acquiring a location and a traveling direction of a user; a reference intersection selection step of selecting, from among intersections displayed on the screen, at least one intersection included in a network of roads extending from the location of the user in the traveling direction as a reference intersection; a point information acquisition step of acquiring, from the map, point information concerning a point near a road in a network of roads extending beyond a reference road as seen from the reference intersection, wherein the reference road is a road which is connected to the reference intersection but does not extend toward the location of the user from the reference intersection; and a map displaying step of displaying the road map on the display device, and displaying the point information acquired by the point information acquisition step so as to appear associated with the reference road associated with the point information. By allowing a computer to execute the program, effects similar to those obtained according to the first aspect can be obtained.

Thus, the third aspect can be implemented as a program, which can be transferred as recorded on a recording medium, thereby making it possible to implement the third aspect on another separate computer system.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
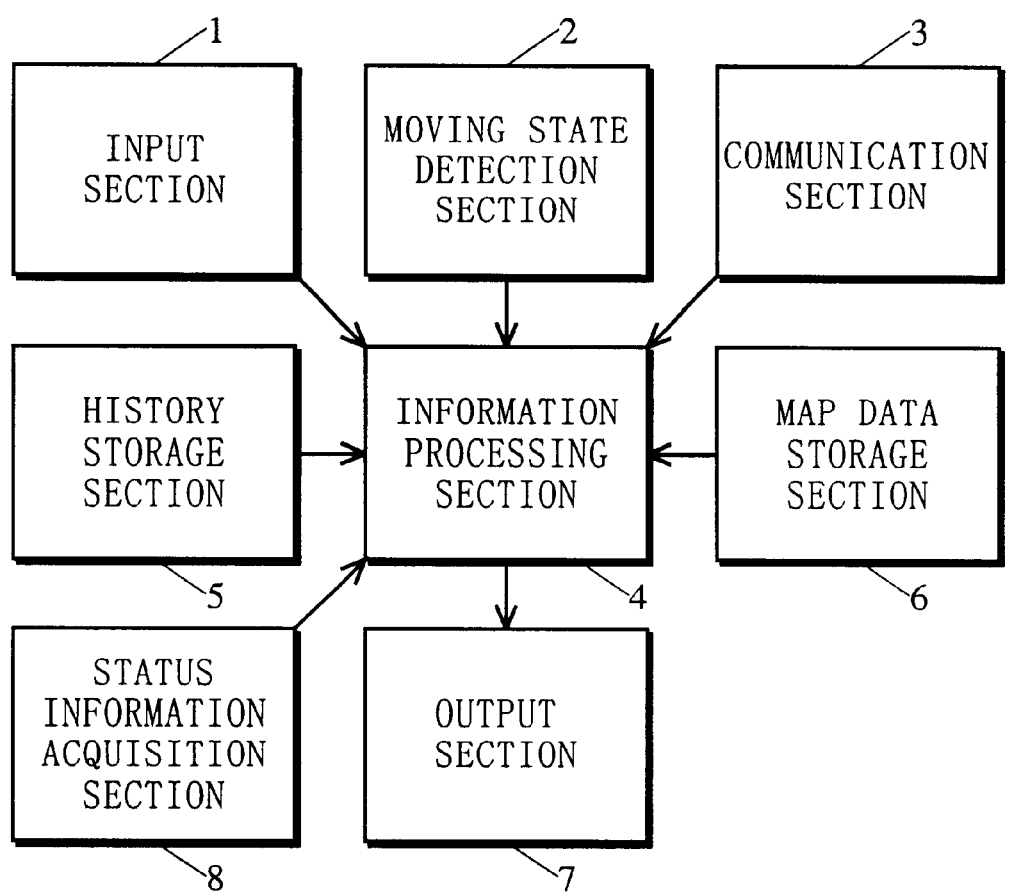
FIG. 1 is a block diagram illustrating the structure of a navigation apparatus according to a first embodiment of the present invention.

FIG. 1 is a block diagram illustrating the structure of a navigation apparatus according to a first embodiment of the present invention. Although it is assumed that the navigation apparatus according to the first embodiment is to be used in a vehicle (e.g., an automobile), in other embodiments, the present navigation apparatus is not limited to the use in vehicles. In FIG. 1, the navigation apparatus comprises an input section 1, a moving state detection section 2, a communication section 3, an information processing section 4, a history storage section 5, a map data storage section 6, an output section 7, and a status information acquisition section 8. Hereinafter, the respective sections of the navigation apparatus will be described.

A user operates the input section 1, which is composed of across key pad, a mouse, a keyboard, and/or the like, for inputting information which is set by the user. The details of the information which is set by the user will be described later with reference to an operation of the present navigation apparatus. The information which has been input via the input section 1 is outputted to the information processing section 4.

The moving state detection section 2, which is typically composed of receiver, a gyrocompass, and a velocity sensor for the GPS (Global Positioning System), detects a current location and a traveling direction of the vehicle (user), and generates current location information representing the coordinates of the current location and information representing the traveling direction. The generated information is outputted to the information processing section 4.

The communication section 3, which is typically composed of a device which is capable of communicating with sites on the Internet, acquires information concerning facilities which are present near the vehicle from outside of the vehicle. The information acquired by the communication section 3 is outputted to the information processing section 4.

The information processing section 4 is composed of a CPU, a ROM, a RAM, and the like. As the CPU executes a program within the ROM while utilizing the RAM as a work area, the information processing section 4 generates image data for displaying a map and facility information concerning facilities, based on information which is inputted from various sections in the navigation apparatus. The facility information may include, for example, name information representing names of facilities and distance information representing distances to such facilities. The facilities for which facility information is to be displayed are facilities which lie ahead of the traveling direction of the. vehicle, e.g., restaurants, convenience stores, tourists spots, and the like in the neighborhood. The specific operation of the information processing section 4 will be illustrated with reference to flowcharts (described later). The image data generated by the information processing section 4 will be outputted to the output section 7.

The history storage section 5 stores history information concerning a history of trips made by the vehicle in the past. The history storage section 5 may store, for example, a history of roads which have been taken by the vehicle in the past, and/or a history of facilities which have been visited by the user in the past. The history storage section 5 may be internalized within the information processing section 4. In other words, the history storage section 5 may be composed of the RAM constituting the information processing section 4. The history information stored in the history storage section 5 is outputted to the information processing section 4.

The map data storage section 6, which is composed of a mass storage device containing a CD-ROM, a DVD, or a HDD as a recording medium therein, stores map data. The map data contains data concerning "nodes" (which represent intersections) and "links" (which represent roads), as well as network data representing interconnections between the roads and the intersections on the map. In the first embodiment, within a piece of link data contained in the map data, various units of data are described in association with the link. Specifically, facility information, road category information, and displayed position information are described as associated with a piece of link data. Herein, it is assumed that the "facility information" stored in the map data storage section 6 is name information representing a name(s) of a facility(s). Note that a piece of facility information which is associated with a given link is information concerning a facility which is located near a road represented by the link. A facility ID identifying a facility is stored together with each piece of facility information. The "road category information" is information representing the category of the road represented by the link (e.g., a national road or a prefectural road). The "displayed position information" is information representing a displayed position at which facility information is displayed in connection with the road. Thus, in addition to a data structure similar to that employed in conventional map data (including a link, facility information, a facility ID, and a road category), displayed position information may be further described in the link data according to the first embodiment of the present invention. The map data stored in the map data storage section 6 is outputted to the information processing section 4.

The output section 7, which is typically composed of a display device and a loudspeaker, displays the image data generated by the information processing section 4 on the display device. The output section 7 may present any portion of the facility information to be displayed on the display device that deserves a particular emphasis in the form of a voice which is emitted via the loudspeaker to the user.

The status information acquisition section 8, which is composed of various sensors mounted in the vehicle, acquires status information. As used herein, the "status information" means various information concerning the status of the vehicle, e.g., a remaining amount of gasoline and a current time. For example, in the case where a remaining amount of gasoline is acquired as the status information, a sensor for detecting the remaining amount of gasoline needs to be mounted in the vehicle. The status information acquired by the status information acquisition section 8 is outputted to the information processing section 4.

Figure 2:
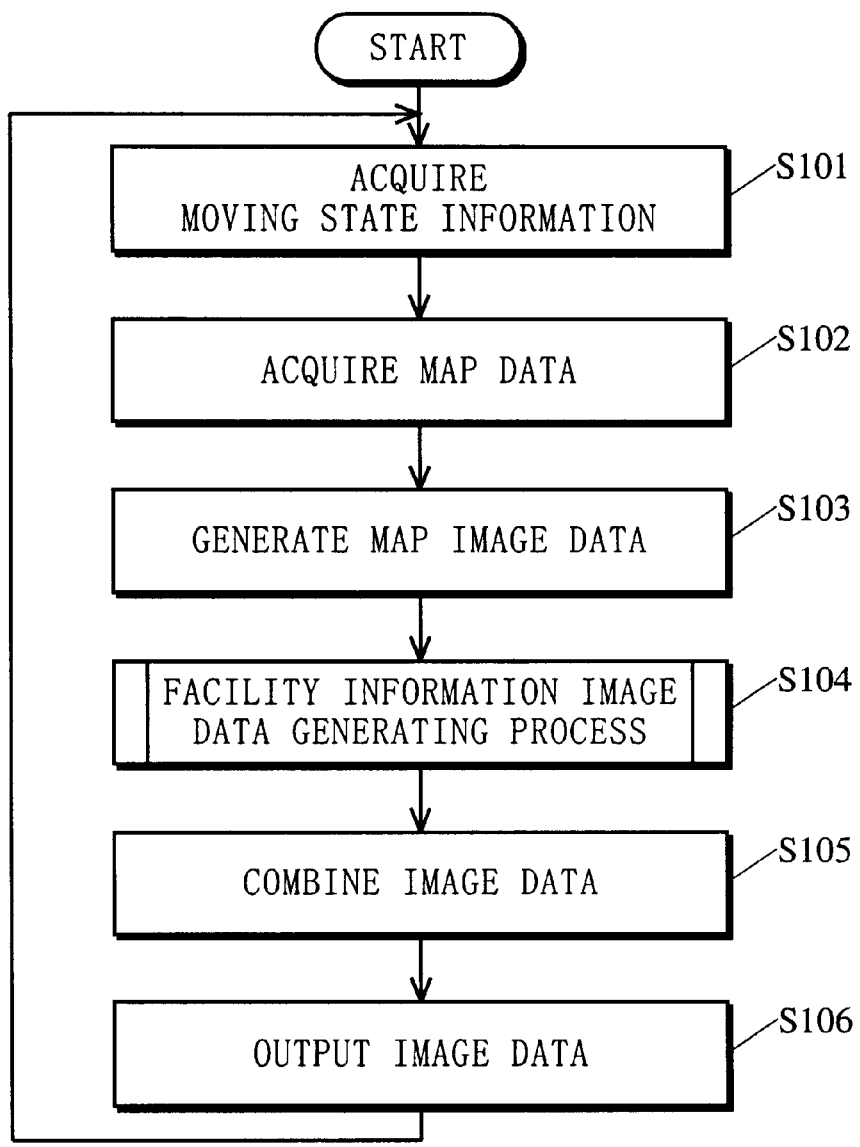
FIG. 2 is a flowchart illustrating a processing procedure by an information processing section 4 shown in FIG. 1 as described in a program to be executed by the information processing section 4.

Next, the operation of the present navigation apparatus will be described. After the navigation apparatus is turned on, the information processing section 4 begins to execute the program recorded in the ROM. FIG. 2 is a flowchart illustrating a processing procedure which is performed by the information processing section 4 in accordance with the program.

First, the information processing section 4 receives the information detected by the moving state detection section 2, thereby acquiring moving state information of the vehicle (step S101). As used herein, the "moving state information" is information comprising current location information (which represents a current location of the vehicle) and traveling direction information (which represents a direction in which the vehicle is traveling). Next, the information processing section 4 acquires the map data (link, node, and road network data) stored in the map data storage section 6 (step S102), and generates map image data based on which a map will be displayed on the display device (step S103). The map data acquired at step S102 is map data of the neighborhood of the current location acquired at step S101. The map image data generated at step S103 is image data of a map of the neighborhood of the current location.

Next, the information processing section 4 performs a facility information image data generating process (step S104). As used herein, the "facility information image data" is image data based on which facility information is displayed. Hereinafter, the details of step S104 will be described. In the first embodiment, the facility information image data is generated at step S104 with respect to only facilities of a specific type, among all the facilities contained in the map, that are necessary for the user. In the following description, the type of a facility whose facility information is to be displayed on the map will be referred to as a "facility type to be displayed". In the first embodiment, it is assumed that the facility type to be displayed is "convenience stores".

Figure 3:
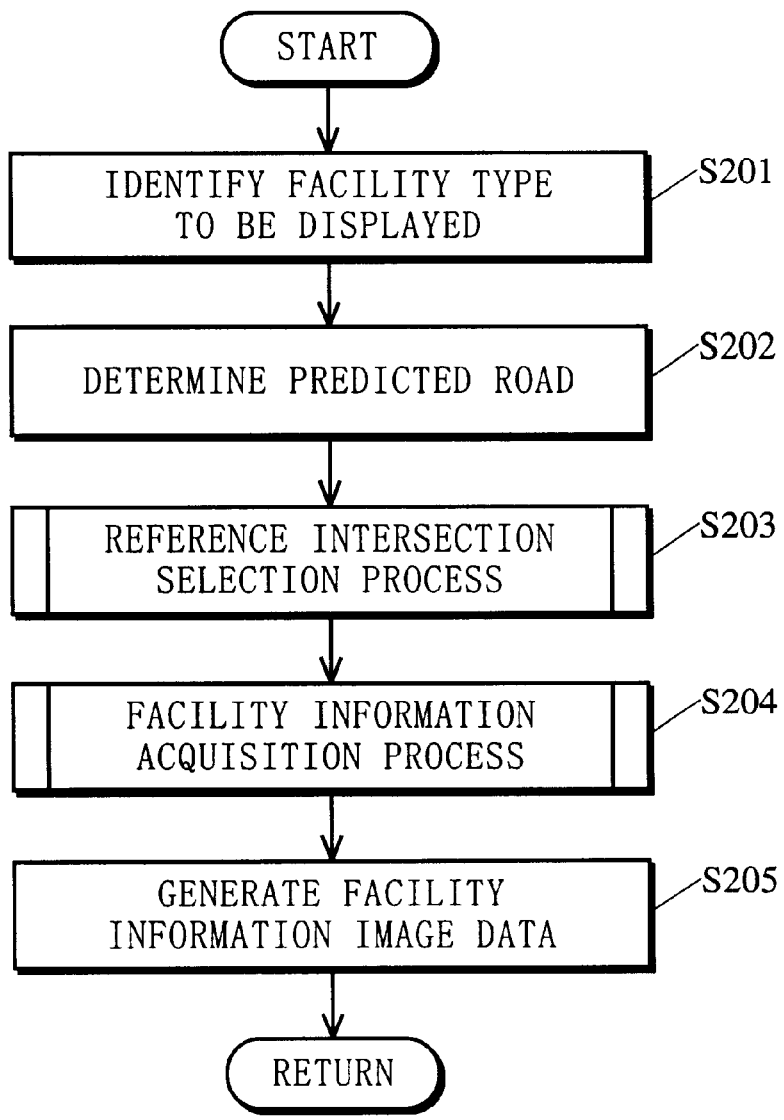
FIG. 3 is a flowchart illustrating the details of step S104 in FIG. 2.

FIG. 3 is a flowchart illustrating the details of step S104 in FIG. 2. First, the information processing section 4 identifies the facility type to be displayed (step S201). In the first embodiment, it is assumed that the facility type to be displayed which is inputted via the input section 1 is acquired at step S201. Specifically, in the first embodiment, it is assumed that the user makes an input via the input section 1 so that information concerning "convenience stores" shall be displayed, whereby the information "convenience stores" is acquired at step S201 as the facility type to be displayed.

Next, the information processing section 4 determines a predicted road from among the roads to be displayed on the map (step S202). As used herein, the "predicted road" is a road which the user is expected to travel along. In the first embodiment, it is assumed that a predicted road is a national road. Specifically, if the current location is on a national road, the national road is determined as a predicted road. If the current location is not on a national road, a national road which is the closest to the current location and extends along the traveling direction of the vehicle is determined as a predicted road. The process of determining a predicted road may be performed as follows, for example. By using the current location and the traveling direction detected by the moving state detection section 2, a network of roads extending along the traveling direction from the current location may be searched for, and the national road which was the first to be found may be determined as a predicted road. Alternatively, any national road which is the closest to the current location, among all the national roads which are displayed on the display device at a given moment, may be determined as the predicted road. The determination as to whether a road is a national road or not is made based on the road category information contained in the map data.

Next, the information processing section 4 performs a reference intersection selection process (step S203). As used herein, a "reference intersection" is an intersection that defines an origin of a network of roads over which facility information to be displayed is searched for. A node representing a reference intersection will be referred to as a "reference node". Thus, a network of roads beginning from the intersection represented by a reference node is computed, and a search is performed for facilities located near the computed network of roads (see step S204 described later). At step S203, at least one of the intersections displayed on the display device is selected as a reference intersection, such that the reference intersection is contained in a network of roads extending forward (i.e., in the traveling direction) from the user's current location. Hereinafter, the details of step S203 will be described.

Figure 4:
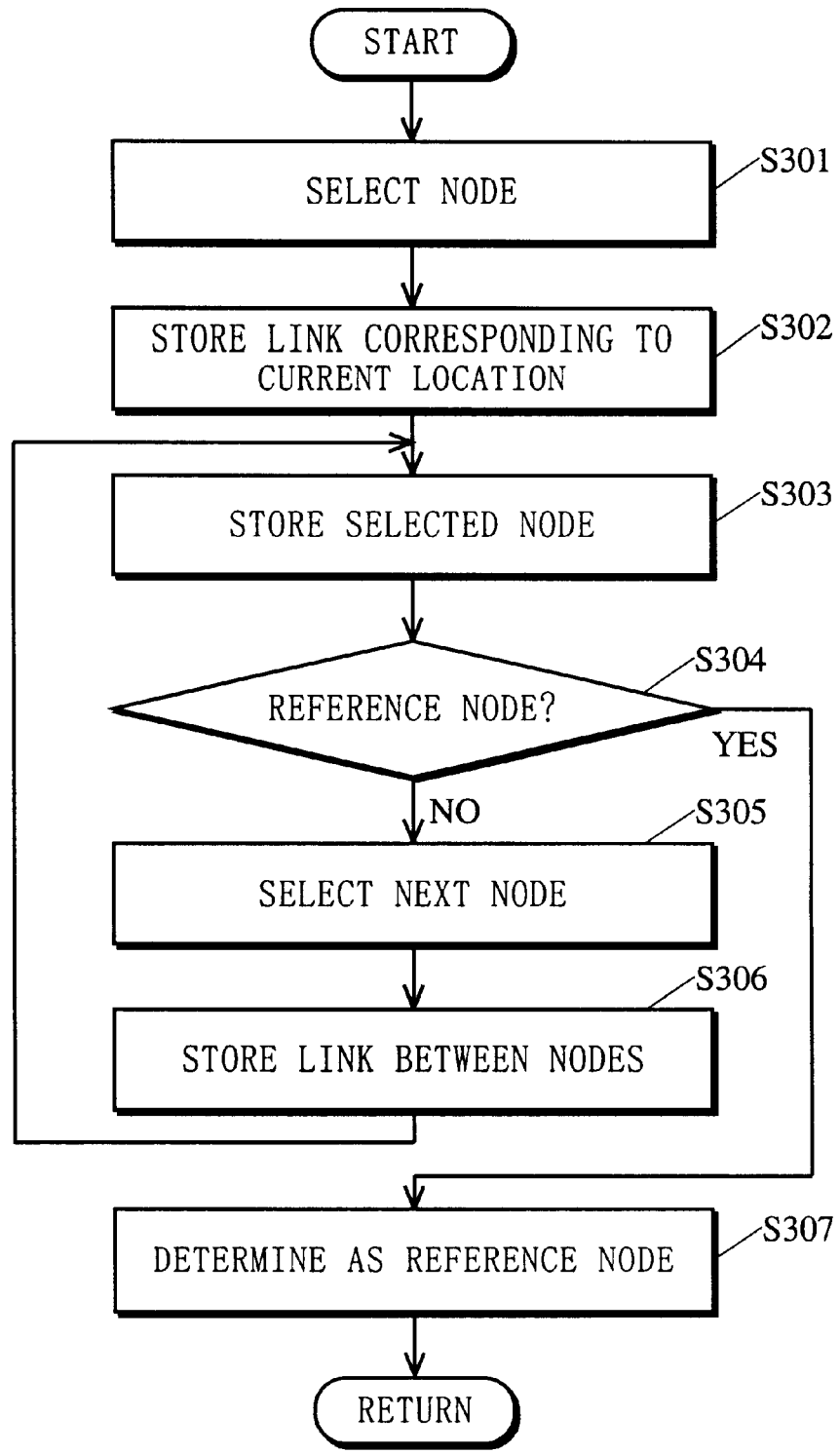
FIG. 4 is a flowchart illustrating the details of step S203 in FIG. 3.
Figure 5:
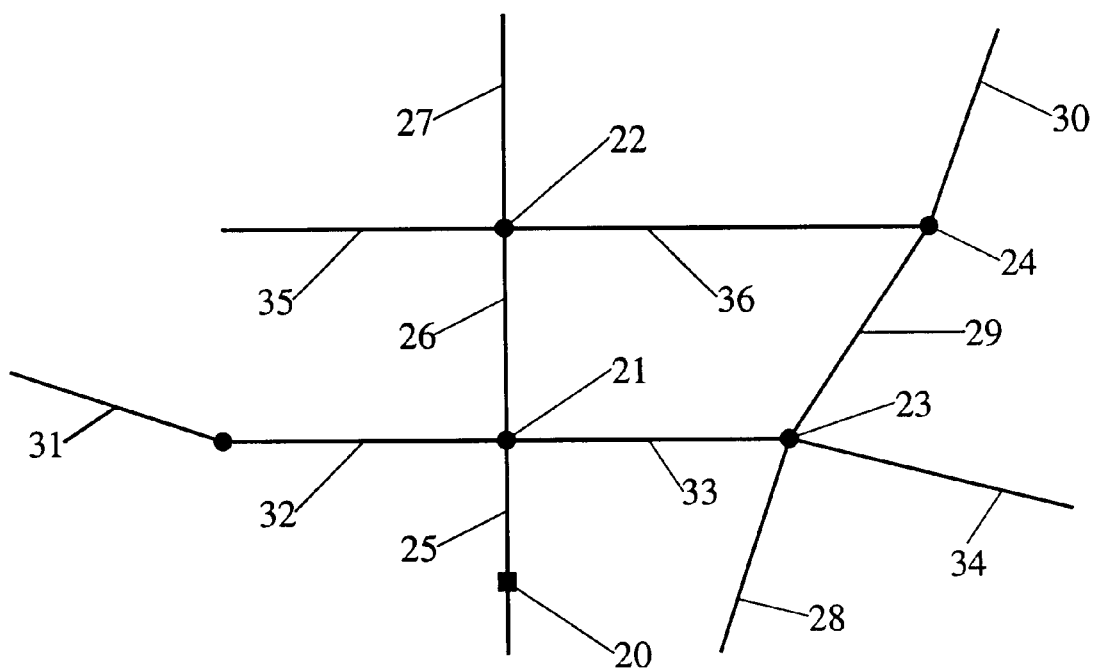
FIG. 5 is a schematic diagram illustrating an example of road network data for which a reference intersection selection process according to the first embodiment is performed.

FIG. 4 is a flowchart illustrating the details of the reference intersection selection process performed at step S203 in FIG. 3. Prior to detailed descriptions thereof, an overview of the reference intersection selection process in FIG. 4 will be given below. FIG. 5 is a schematic diagram illustrating an example of road network data for which the reference intersection selection process is performed. In FIG. 5, reference numeral 20 denotes a current location; 21 to 24 each denote a node; and 25 to 36 each denote a link. In the reference intersection selection process, each of the nodes coupled to a link(s) representing a predicted road is examined to see whether it is a reference node or not, thereby selecting a reference intersection (reference node) In the example shown in FIG. 5, if the links 25 to 27 are determined as constituting the predicted road at step S202, the nodes 21 and 22 are examined to see whether they are reference nodes or not. If the links 25, 33, and 34 are determined as constituting the predicted road, the nodes 21 and 23 are examined to see whether they are reference nodes or not.

The determination as to whether a node is a reference node or not is based on whether the node satisfies a predetermined condition or not. In the first embodiment, it is assumed that the predetermined condition is stipulated as "an intersection which is the closest to the current location, chosen from among the intersections coupled to a national or prefectural road other than the predicted road". In the example shown in FIG. 5, assuming that the links 25 to 27 are a national road(s), if the links 31 to 34 are a national road(s) or a prefectural road(s), the node 21 is selected as a reference node. Still assuming that the links 25 to 27 are a national road(s), if the links 32 and 33 are neither a national road(s) nor a prefectural road(s), the node 21 is not selected as a reference node. Next, the node 22 is also examined in light of the above predetermined condition, and if the links 35 and 36 are a national road(s) or a prefectural road(s), the node 22 is selected as a reference node. In the first embodiment, the nodes which are closer to the current location are subjected to the above reference node determination first. Thus, the outline of the method for selecting reference nodes in the first embodiment has been described. Hereinafter, the flowchart of FIG. 4 will be described in more detail.

First, the information processing section 4 selects one of the nodes displayed on the map which are coupled to the link(s) representing a predicted road (step S301). In the first embodiment, a node which lies in the traveling direction of the vehicle and is the closest to the current location is selected. In the following description, a node which has been selected at step S301 or step S305 will be referred to as a "selected node". Next, the information processing section 4 stores a link which corresponds to the current location (step S302). Furthermore, the information processing section 4 stores the selected node determined at step S301 or step S305 (step S303). In the second and subsequent run of step S303, only the most-recent selected node is stored and any old (i.e., previously stored) selected node is discarded. Thus, at step S303, the information processing section 4 keeps updating the selected node.

Next, the information processing section 4 determines whether the selected node satisfies the predetermined condition for being a reference node or not (step S304). As described above, the first embodiment assumes the predetermined condition to be "an intersection (node) which is the closest to the current location, chosen from among the intersections (nodes) coupled to a national or prefectural road other than the predicted road". Therefore, the determination of step S304 is made based on whether or not the road category of a link connected to the selected node is a national or prefectural road.

If step S304 finds that the selected node is not a reference node, the information processing section 4 selects a next node (step S305). Specifically, at step S305, the information processing section 4 selects one of the nodes adjoining the immediately previously selected node that is on the predicted road and farther away from the current location as the next node. In the example shown in FIG. 5, if the immediately previously node is the node 21, the node 22 is on the predicted road (links 25 to 27) and yet farther away from the current location 20; therefore, the node 22 is selected next to the node 21. As a result, the reference node determination is performed for nodes which are closer to the current location first. As mentioned above, the node selected at step S305 is also referred to as a "selected node".

After step S305, the information processing section 4 stores a link between the node stored at step S303 (the previous selected node) and the node selected at step S305 (the current selected node) (step S306),and returns to step S303. In the second and subsequent run of step S306, the information processing section 4 keeps updating the link, as is the case with step S303. Once the link is stored at step S306, the link having been stored at step S302 is discarded.

On the other hand, if step S304 finds that the selected node is a reference node, the information processing section 4 determines the selected node, i.e., the node stored at step S303, as a reference node (step S307), and ends the subroutine of step S203. At step S307, the information processing section 4 stores the link which has been stored at step S302 or S306 in association with the reference node.

Referring back to FIG. 3, next to step S203, the information processing section 4 performs a facility information acquisition process (step S204). At step S204, a reference road for computing a network of roads is set. In the first embodiment, a "reference road" is defined as a road which is connected to a reference intersection, other than those extending back to the current location from the reference intersection. Furthermore, from the map data storage section 6, the information processing section 4 acquires facility information concerning facilities near a network of roads extending beyond the reference road as seen from the reference intersection. Specifically, at step S204, a network of roads beginning from the intersection represented by the reference node determined at step S203 is computed, and from among the facilities located near the roads included in the network of roads, facility information concerning those which are of the aforementioned facility type to be displayed is acquired. In the first embodiment, not only the facility information stored in the map data, but also facility information acquired by another method (described later) is also displayed. Hereinafter, the facility information acquisition process will be described in more detail.

Figure 6:
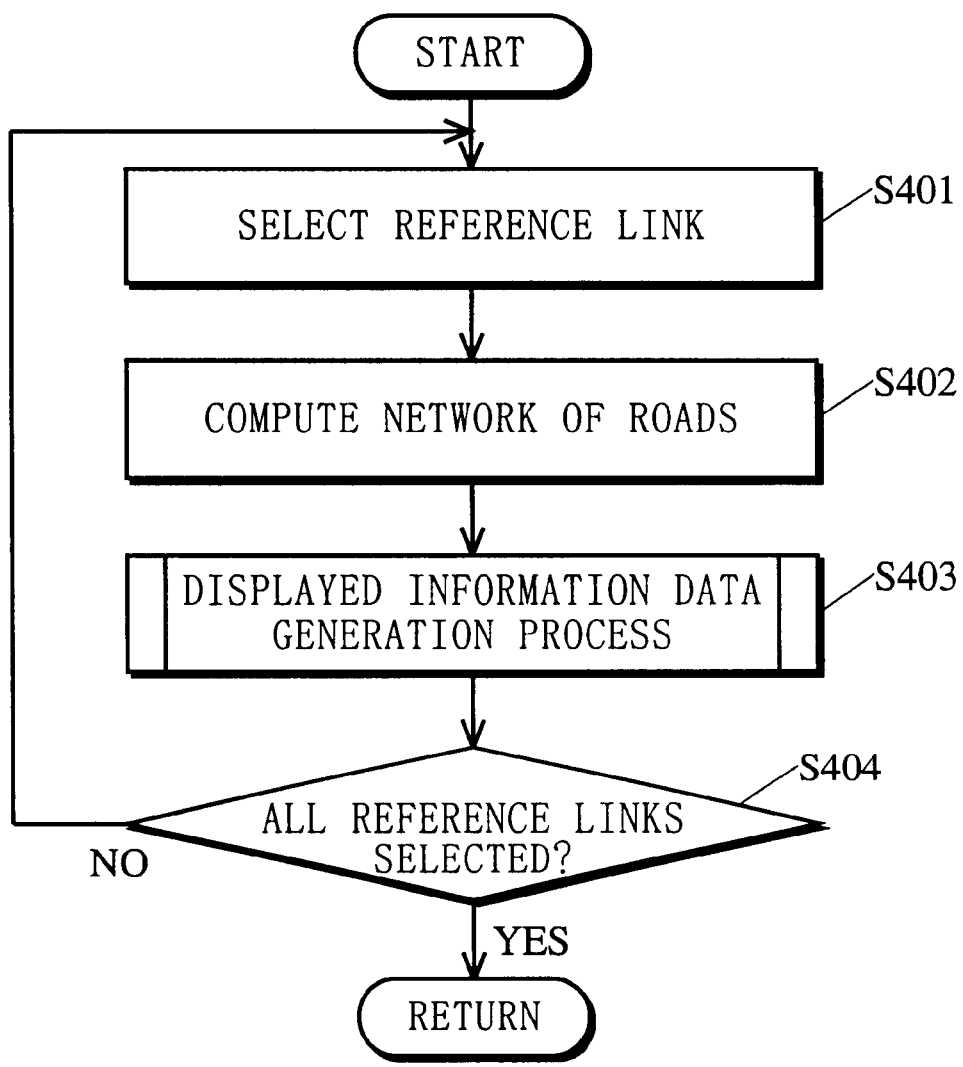
FIG. 6 is a flowchart illustrating the details of step S204 in FIG. 3.

FIG. 6 is a flowchart illustrating the details of step S204 in FIG. 3. First, the information processing section 4 selects a reference link (step S401). As used herein, a "reference link" is a link representing a reference road, i.e., any link connected to a reference node that does not extend toward the current location. In other words, a "reference link" is any link connected to a reference node that has not been stored at step S307 in FIG. 4. In the example shown in FIG. 5, if the node 21 is a reference node, then the links 26, 32, and 33 are reference links. Therefore, in this case, one of the links 26, 32, 33 is selected at step S401. In the following description, the reference link which is selected at step S401 will be referred to as a "selected link".

Next, the information processing section 4 computes a network of roads extending beyond the reference road as seen from the reference intersection (step S402). In the first embodiment, the network of roads computed at step S402 will be referred to as a "search network". At step S402, a search network containing the selected link determined at the previous step S401 is computed. As a result, a search network data containing a road represented by the selected link is generated. Hereinafter, the details of step S402 will be described.

Figure 7:
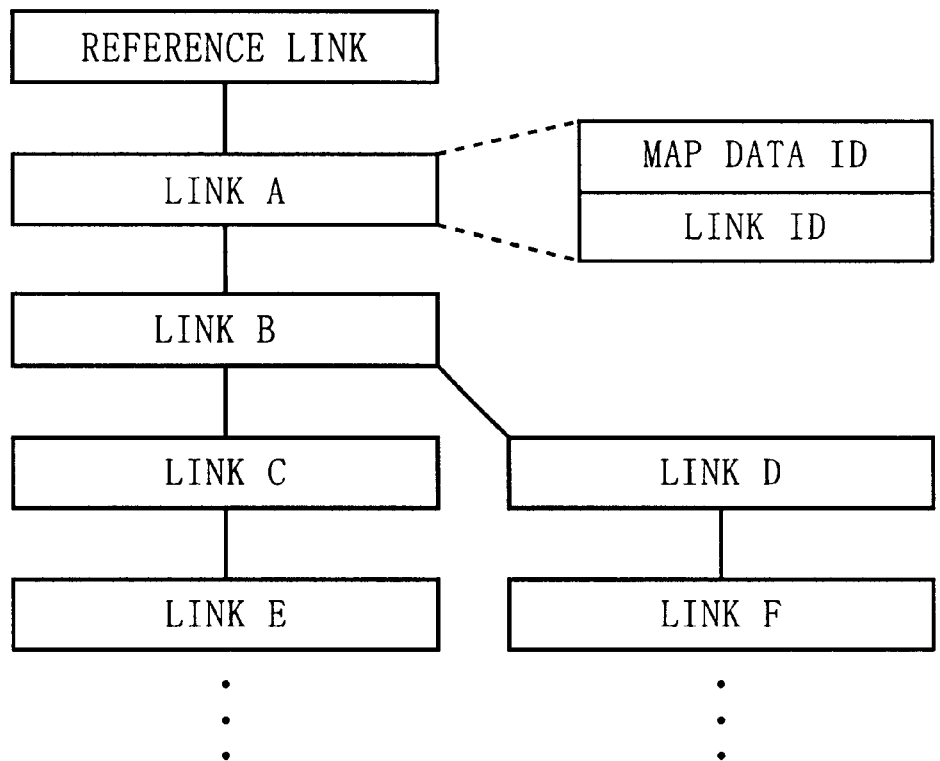
FIG. 7 is a diagram illustrating a data structure of search network data which is generated at step S402 in FIG. 6.

FIG. 7 is a diagram illustrating the data structure of the search network data which is generated at step S402 in FIG. 6. As shown in FIG. 7, the search network data is composed of a tree-structured list, beginning from the reference link at the top. At step S402, the information processing section 4 first sets the selected link selected at the previous step S401 as the top of the tree structure shown in FIG. 7. The search network data shown in FIG. 7 is composed of link information representing links, where each piece of link information is composed of a map data ID and a link ID. The map data ID is a piece of information identifying a fragment of map data. The link ID is a piece of information identifying a link contained in such a fragment of map data. Thus, all of the links contained in the map data can be uniquely expressed by using the map data IDs and the link IDs.

Next, the information processing section 4 causes a link (s) connected to the reference link to be stored as search network data. Note that "a link(s) connected to the reference link" is a link(s) connected to one of the two nodes of the reference link that is not the reference node. In the example shown in FIG. 5, if the node 21 is the reference node and the link 32 is the selected link, then the link 32 is the reference link, and the link 31 is the link connected to the reference link. In other words, in this example, link A shown in FIG. 7 is the link 31.

Furthermore, the information processing section 4 stores any link(s) which is connected to the link(s) which has been stored as the search network data also as the search network data. If a number of links are connected to a given link, the tree of the search network data is correspondingly constructed so as to have the number of links branched off from the given link. For example, the search network data shown in FIG. 7 illustrates a case where links C and D are connected to link B.

Thus, the search network data is generated by consecutively searching for links connected to the reference link and storing the found links as search network data. Note that the search network begins at the selected link and expands away from the reference node. The generation of the search network data is ended when the search network has expanded to a predetermined range. The predetermined range is typically defined as a range of links which are within a predetermined distance from a selected link. If it is possible to compute the amount of time required to reach a link, the predetermined range may be defined as encompassing links which can be reached from the selected link within a predetermined period of time. Alternatively, the generation of the search network data may be ended when the number of links composing the search network data reaches a predetermined value.

Referring back to FIG. 6, next to step S402, the information processing section 4 performs a displayed information data generation process (step S403). As used herein, "dis-played information data" is data representing information necessary for displaying the facility information. At step S403, facilities are searched for within the search network, and one piece of displayed information data is generated for each piece of facility to be displayed. Hereinafter, the displayed information data generation process will be described in detail.

Figure 8:
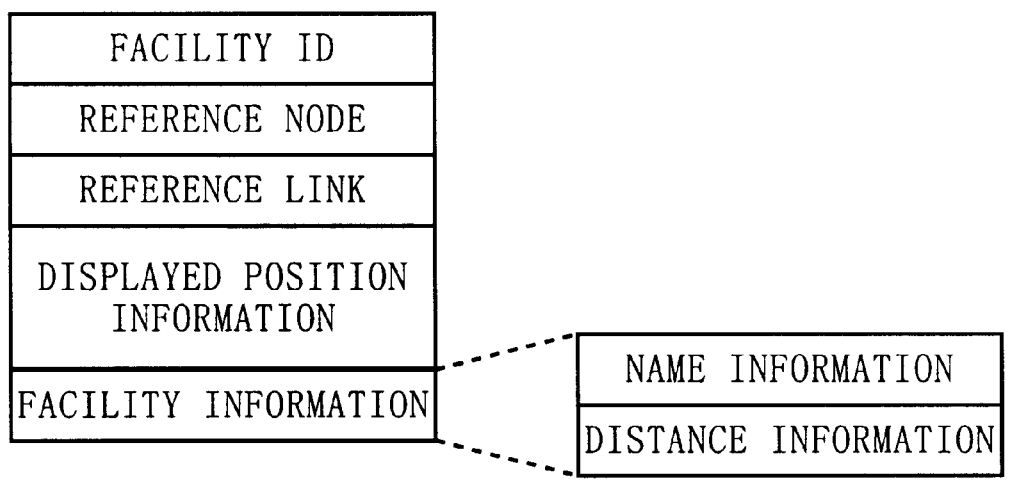
FIG. 8 is a diagram illustrating a data structure of displayed information data which is generated at step S403 in FIG. 6.

FIG. 8 is a diagram illustrating the data structure of the displayed information data which is generated at step S403 in FIG. 6. As shown in FIG. 8, the displayed information data contains a facility ID, a reference node, a reference link, displayed position information, and facility information. Each unit of information contained in the displayed information data is acquired as follows.

Figure 9:
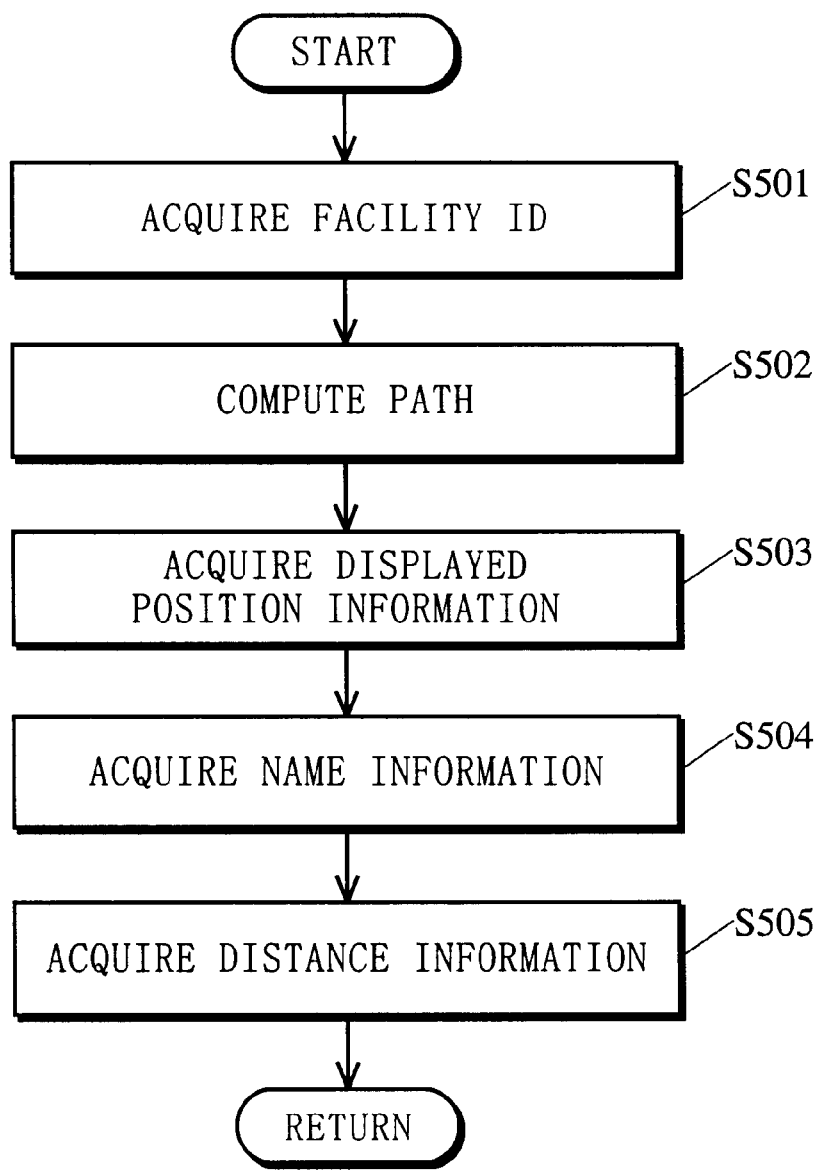
FIG. 9 is a flowchart illustrating the details of step S403 in FIG. 6.

FIG. 9 is a flowchart illustrating the details of step S403 in FIG. 6. First, by using the search network data generated at step S402, the information processing section 4 acquires the facility ID for the facility information to be displayed (step S501). The facility ID is information identifying a facility, e.g., the name, type, and/or the like of the facility. As the facility ID, facility type and ID may be indicated, such as "convenience store-001". The facility ID is stored in the map data in advance, and is acquired from the map data storage section 6. Hereinafter, the process of acquiring a facility ID as performed by the information processing section 4 will be described.

The information processing section 4 acquires a facility ID for a piece of facility information which is associated with a link contained in the search network data and is of the facility type to be displayed as identified at step S201. As described earlier, the "facility type to be displayed" means the type of a facility for which facility information image data is to be generated. In the case where the facility type to be displayed is set to be "convenience stores", as in the first embodiment, the information processing section 4 acquires a facility ID which indicates a convenience store, from among the facility IDs associated with the links contained in the search network data. For the facility whose facility ID has been thus acquired, other information concerning the facility is acquired. Specifically, the information processing section 4 acquires a reference node ID, a reference link ID, displayed position information, and facility information for the facility whose facility ID has been acquired.

In the first embodiment, facility information associated with a given link is determined by using the map data, in which roads and facilities are associated with each other in advance. As described earlier, in the first embodiment, a link representing road and facility information of a facility(s) adjoining the road are associated with each other in the map data. Therefore, a facility ID associated with a link can be easily acquired by referring to the map data. In embodiments where links are not associated with facility IDs in the map data, correspondence between the links and the facility IDs may be determined by other methods. For example, location information of facilities may be stored in the map data in association with facility IDs, and any facility ID which represents a facility which is located at a predetermined distance off a link may be determined as being associated with that link.

Next to step S501, the information processing section 4 computes a path from the reference intersection to the facility indicated by the facility ID acquired at step S501 (step S502). The computation of the path is performed based on the search network computed at step S402.

Moreover, the information processing section 4 acquires a reference node and a reference link when computing the aforementioned path. The reference node to be acquired here is the reference node which has been determined at the time of generating the displayed information data, i.e., the node determined at step S307 and stored at step S303. The reference link to be acquired here is the selected link which has been determined at the time of generating the displayed information data, i.e., the link selected at step S401.

Next, the information processing section 4 acquires displayed position information (step S503). As defined earlier, the displayed position information is information representing a displayed position at which facility information is displayed in connection with the road. The displayed position information is determined based on the reference link so that the facility information is displayed near the reference link. For example, the displayed position information may indicate "to be displayed in the center of the link", "to be displayed at the other end of the link (i.e., the end which is not connected to the reference intersection)", or the like. As described earlier, in the first embodiment, the displayed position information is previously stored in the map data in association with each link contained in the map data. Therefore, the displayed position information is acquired from the map data storage section 6. The displayed position information to be acquired here is the displayed position information in the map data which is associated with the selected link determined at the previous step S401.

Next, at steps S504 and S505, the information processing section 4 acquires the facility information to be displayed on the map. As shown in FIG. 8, in the first embodiment, distance information is acquired in addition to the name information contained in the map data. In other words, in the first embodiment, not only the facility information previously stored in the map data storage section 6, but also facility information acquired by another method (i.e., distance information in this example) is computed and displayed. First, the information processing section 4 acquires the facility information contained in the map data (step S504). The facility information contained in the map data is associated with a link(s) and a facility ID in the map data stored in the map data storage section 6. Therefore, at step S504, the facility information corresponding to the facility ID acquired at step S501 is acquired from the map data storage section 6. It is assumed herein that the facility information contained in the map data is name information representing the name of a facility.

Next, the information processing section 4 acquires distance information representing the distance from the current location to the facility (step S505), and ends the subroutine of step S403 shown in FIG. 9. The distance information is computed based on the path from the reference intersection to the facility as computed at step S502. Specifically, the distance information is computed as a sum of the distance of the path from the reference intersection to the facility and the distance from the current location to the reference intersection. In other embodiments, estimated travel time information may be used instead of distance information. As used herein, "estimated travel time information" is information representing an estimated travel time from the current location to a facility indicated by a facility ID. The estimated travel time information may be computed based on the path computed at step S502, similarly to the distance information.

The facility information may include other information as well. For example, in the case where the facility is a restaurant, business hours, the presence/absence of a parking lot, and the like may be also be included in the facility information in addition to the name of the restaurant. In the case where the facility is a gas station, unit price information may be included in the facility information, for example. The facility information may be obtained by acquiring information which is previously stored in the map data, or may be externally acquired by means of the communication section 3. Examples of facility information which is externally acquired by means of the communication section 3 are information concerning how crowded a shop is and the latest bargain information.

Referring back to FIG. 6, next to step S403, the information processing section 4 determines whether all possible reference links have been selected as selected links at step S401 or not (step S404). If there is one or more reference links which have not been selected yet, the information processing section 4 returns to step S401 to repeat the process from steps S401 to S404. On the other hand, if all possible reference links have been selected, it is certain that a search has been performed for search networks corresponding to all possible reference links (e.g., one search network in the case where there is only one reference link). Since a network of roads extending from the reference intersection can be regarded as a combination of search networks corresponding to all selected links, a search having been performed for search networks corresponding to all possible reference links means that a search has been performed for a network of roads in a predetermined range from the reference intersection. Therefore, if step S404 finds that all possible reference links have been selected, the information processing section 4 ends the facility information acquisition process.

Referring back to FIG. 3, after the facility information acquisition process is over, the information processing section 4 generates facility information image data based on the displayed information data generated at step S204 (step S205). Specifically, the facility information image data is generated such that the content of the facility information is displayed at the displayed position indicated by the displayed position information contained in the displayed information data. Thus, the facility information image data generation process shown in FIG. 3 is completed.

Referring back to FIG. 2, next to step S104, the information processing section 4 combines the map image data and the facility information image data (step S105). The information processing section 4 outputs the combined image data to the output section 7 (step S106). The outputted image data is displayed on the display device of the output section 7. At this step S106, a road map is displayed on the display device together with the facility information acquired through the facility information acquisition process at step S204, the facility information being displayed in connection with a road associated with the facility information. After step S106, the information processing section 4 returns to the process of step S101, and repeats the process of steps S101 to 106. As a result, the map on which facility information is displayed keeps being updated.

Figure 10:
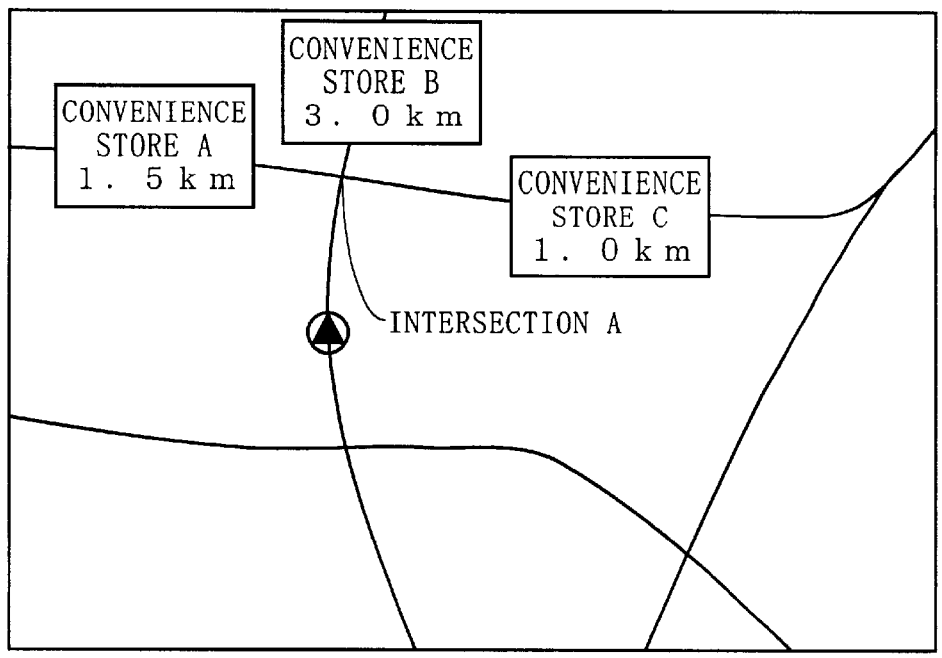
FIG. 10 shows an exemplary image displayed by the navigation apparatus according to the first embodiment.

FIG. 10 shows an exemplary image displayed by the navigation apparatus according to the first embodiment. In FIG. 10, it is assumed that "convenience stores" has been designated as the facility type to be displayed, and that the content to be displayed as facility information is the name of each convenience store and the distance thereof from the current location. It is further assumed in FIG. 10 that the reference intersection is intersection A (note that the letters "intersection A" will not be displayed on the actual screen).

As shown in FIG. 10, in the first embodiment, information concerning facilities near each road extending from intersection A (except for roads extending toward the current location), i.e., facility information, is displayed. As described above, the displayed position information which dictates the displayed position of the facility information is determined so that the facility information is displayed near the corresponding reference link. As a result, the user can immediately understand which road the user should take at an intersection to arrive at a desired facility (i.e., a convenience store in this example). Furthermore, in the example shown in FIG. 10, the distance from the current location is displayed with respect to each facility. As a result, even when a plurality of pieces of facility information are displayed, the user can easily determine which facility to visit.

The reason why roads extending toward the current location from the reference intersection are not selected as reference roads is that there is no need to display what lies ahead along such roads because the user moving from the current location to the reference intersection will travel along such roads. Thus, it is not necessary to search for facility information near roads extending toward the current location from the reference intersection. In fact, displaying more information than necessary to the user may render the entire map difficult to see. Thus, by computing a network of roads except for roads extending toward the current location from the reference intersection, it is possible to display only the facility information which is useful to the user.

Although facility information is displayed as information on the map in the first embodiment, any other information may be displayed instead. The information to be displayed may be any "point information", i.e., information concerning each point in the neighborhood of where the vehicle is going. Examples of point information include the aforementioned facility information, information concerning names of places in the neighborhood, and the like. The definition of facility information may be extended to include information concerning facilities which are specific to the user (e.g., houses of the user's acquaintances).

In the first embodiment, the facility type to be displayed is set by the user via the input section 1. In other embodiments, the facility type to be displayed may be set by other methods. For example, the facility type to be displayed may be set based on the aforementioned status information which is acquired by the status information acquisition section 8. An exemplary embodiment in which the facility type to be displayed is determined based on the status information may be as follows. If a sensor mounted in the vehicle detects that the remaining amount of gasoline is low, the information processing section 4 having acquired such information from the sensor may set "gas stations" as the facility type to be displayed. As a result, gas station information will be displayed on the map, thereby allowing the user to know that the remaining amount of gasoline is low and to obtain information concerning gas stations in the neighborhood. In the case where the current time is used as status information, the information processing section 4 may set "restaurants" as the facility type to be displayed when the current time reaches a time for taking a meal (e.g., 12 o'clock).

The facility type to be displayed maybe determined based on the history information stored in the history storage section 5. For example, if apiece of history information indicating that information concerning a restaurant has been displayed at a given point in the past is found stored, the information processing section 4 may set "restaurants" as the facility type to be displayed when the vehicle comes in the neighborhood of the point.

Although the first embodiment assumes that the predicted road is a national or prefectural road, the predicted road may be determined based on other conditions in other embodiments. For example, if a route to a destination has been computed in the navigation apparatus, the route may designated as the predicted road. In the case where a route to a destination is designated as the predicted road, it is possible to predict with certainty which roads the user will travel along. Instead of a route, a history of roads traveled along by the vehicle in the past may be stored, and a road which has been traveled along in the past may be designated as the predicted road.

In the first embodiment, a reference node is determined as an intersection (node) which is the closest to the current location, chosen from among the intersections (nodes) coupled to a national or prefectural road other than the predicted road. In other embodiments, reference nodes maybe determined base on other conditions. For example, a history of roads traveled along by the vehicle in the past may be stored in the history storage section 5, and reference nodes may be determined based on such a history. Specifically, based on the history information, a node may be determined to be a node representing an intersection connecting the predicted road and a road stored in the history storage section 5. An intersection which is coupled to a road which has been traveled along by the user in the past has a relatively high likelihood of being turned at by the user again. Therefore, by determining reference nodes based on the history information, facility information can be displayed in connection with an intersection which is likely to be turned at by the user. Thus, it is possible to display facility information which is likely to be utilized by the user.

The search over a search network may be performed only with respect to roads of a particular road category. For example, the search may be performed only with respect to links representing national or prefectural roads. In this case, if a road is branching out, the search will be performed only with respect to the major roads, and not any other roads. Thus, by performing a search with respect to limited links, the time required for the search process can be reduced. Moreover, the general psychology of the user is that they do not wish to tread onto lesser roads (i.e., roads other than national or prefectural roads) in unfamiliar places. Therefore, even if facility information is acquired as a result of performing a search for roads other than the major roads, the possibility of actually utilizing such facilities is considered to be low. Accordingly, by performing a search only with respect to roads of a particular road category, it is possible to perform an efficient search while refraining from performing unnecessary searches.

Furthermore, in the first embodiment, the search network computation process and the facility information search process are performed separately; specifically, after search network data is generated (step S402), facility information is acquired based on the generated search network data (step S403). In other embodiments, the search network computation process and the facility information acquisition process may be performed in alternating turns, where, every time a link is found in a search network computation process, a piece of facility information associated with the found link is acquired.

Although the first embodiment describes no limitation as to the number of pieces of facility information to be displayed, a limitation may be provided for the number of pieces of facility information to be displayed with respect to each road. The condition for limiting the number of pieces of facility information to be displayed may be distance, estimated travel time, or the like, for example. For example, up to three facilities closest to the current location may be displayed as facility information. In the case where the number of pieces of facility information to be displayed is limited, the search network computation process and the facility information acquisition process may be performed in alternating turns as mentioned above. As a result, it becomes possible to end the search network computation when the limit number of pieces of facility information have been acquired, whereby the time needed for the entire processing can be reduced.

Although the first embodiment employs a two-dimensional map representation, i.e., a plan view, a three-dimensional map representation may be employed instead, e.g., a bird's-eye view.

In each processing instance of the first embodiment described above, there is only one reference intersection, i.e., an intersection that defines an origin of a network of roads over which facility information to be displayed is searched for. If a plurality of roads extend from the reference intersection, facility information is searched for and displayed independently with respect to each such road. As a result, the first embodiment may be plagued by the following situation.

Figure 11:
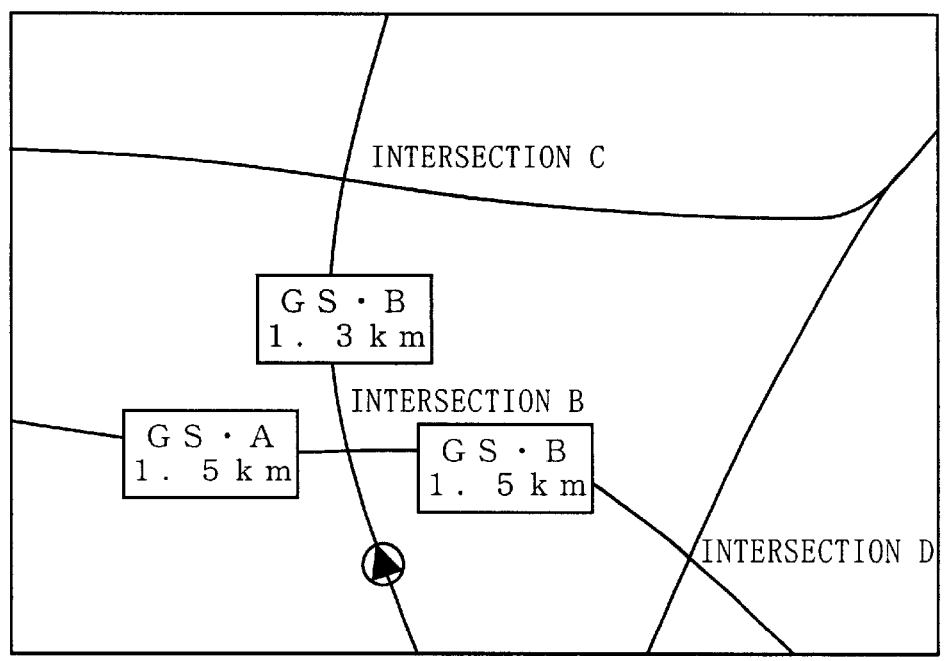
FIG. 11 is another exemplary image displayed by the navigation apparatus according to the first embodiment.

FIG. 11 is another exemplary image displayed by the navigation apparatus according to the first embodiment, where the names of gas stations (e.g., "GS·A") which are in the neighborhood of the current location and their distances from the current location are displayed. In FIG. 11, intersection B is the reference intersection. In the exemplary image of FIG. 11, facility information "GS·C 1.3 km" is displayed in connection with the road extending from intersection B to intersection C, and facility information "GS·C 1.5 km" is displayed in connection with the road extending from intersection B to intersection D. Thus, in the first embodiment, where facility information is displayed independently with respect to each of the reference roads connected to the reference intersection, a plurality of pieces of facility information may be displayed redundantly with respect to the same content. Not only is such redundant displaying unnecessary to the user, but it renders the displayed information all the more difficult for the user to understand. Therefore, it is preferable to prevent such redundant displaying.

Accordingly, the processing according to a second embodiment of the present invention is performed in such a manner as to prevent redundant displaying. Note also that it is possible to select a plurality of reference intersections in the second embodiment. Therefore, according to the second embodiment, the condition for determining an intersection to be a reference intersection is stipulated as "an intersection coupled to a national road or prefectural road other than the predicted road".

In the second embodiment, facility information is displayed only when a predetermined activation condition is satisfied. As used herein, the "activation condition" is a condition for allowing facility information to be displayed. Specifically, in the second embodiment, the activation condition is stipulated as "the remaining amount of gasoline becoming low", and facility information (gas station information) is displayed when this condition is satisfied. Hereinafter, the second embodiment of the present invention will be described.

The structure of the navigation apparatus according to the second embodiment is identical to that according to the first embodiment (illustrated in FIG. 1). Therefore, the following description relies on FIG. 1 for structural details. Hereinafter, the operation of the navigation apparatus according to the second embodiment will be described with reference to FIGS. 12 to 14.

Figure 12:
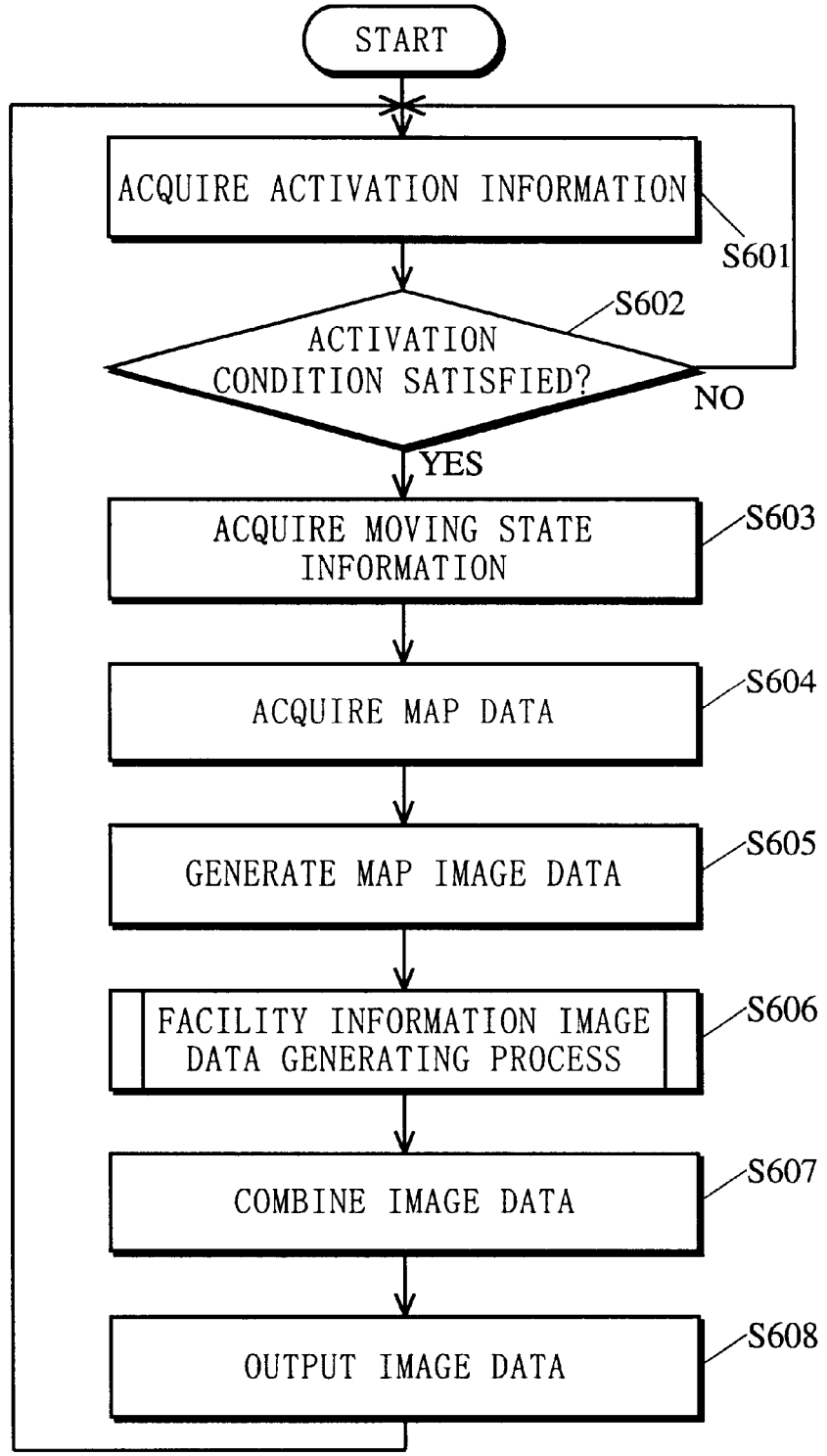
FIG. 12 is a flowchart illustrating a processing procedure by the information processing section 4 according to a second embodiment of the present invention.

FIG. 12 is a flowchart illustrating a processing procedure by the information processing section 4 according the second embodiment of the present invention. The operation shown in FIG. 12 differs from the operation of the first embodiment (see FIG. 2) with respect to steps S601 and S602. First, the information processing section 4 acquires activation information (step S601). As used herein, the "activation information" refers to information necessary for determining the activation condition. For example, in the case where the activation condition is "gasoline becoming low (the remaining amount of gasoline becoming equal to or less than a predetermined value)", the activation information is information concerning the remaining amount of gasoline. The information concerning the remaining amount of gasoline can be acquired by a sensor (as an example of the status information acquisition section 8) that detects the remaining amount of gasoline.

Next, based on the activation information acquired at step S601, the information processing sect ion 4 determines whether the activation condition is satisfied or not (step S602). In the above example, the activation condition is determined to be satisfied when the remaining amount of gasoline indicated by the activation information has become equal to or less than the predetermined value. The activation condition is previously stored in a storage device in the information processing section 4.

If step S602 finds that the activation condition is satisfied, the information processing section 4 proceeds to the process of step S603. On the other hand, if step S602 finds that the activation condition is not satisfied, the information processing section 4 returns to the process of step S601. The process of step S601 is preferably performed at predetermined time intervals (e.g. five minutes).

Figure 13:
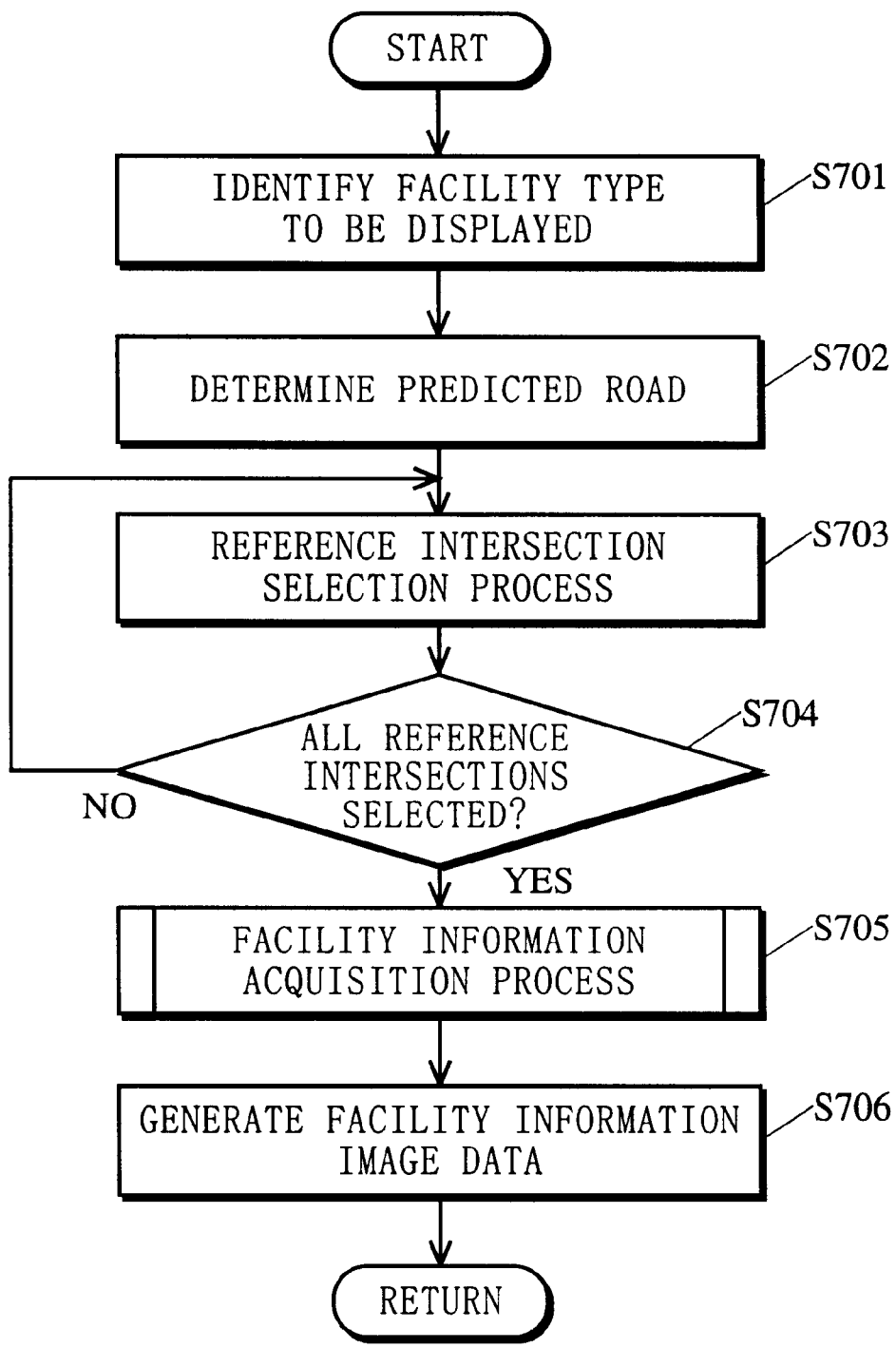
FIG. 13 is a flowchart illustrating the details of step S606 according to the second embodiment.

Steps S603 to S605 in FIG. 12 are identical to their counterparts in the first embodiment (steps S101 to S103 show in FIG. 1), and the descriptions thereof are omitted. The details of the facility information image data generation process of step S606 are illustrated in FIG. 13. Hereinafter, step S606 will be described with reference to FIG. 13.

FIG. 13 is a flowchart illustrating the details of step S606 according to the second embodiment. First, the information processing section 4 identifies a facility type to be displayed (step S701), and determines a predicted road from among the roads to be displayed on the map (step S702). Steps S701 and S702 are identical to steps S201 and step S202 of the first embodiment. It is assumed in the second embodiment that the facility type to be displayed is "gas stations". It is assumed that, as in the first embodiment, the predicted road is a national or prefectural road.

Next, the information processing section 4 performs a reference intersection selection process (step S703). The process of step S703 is identical to the reference intersection process in the first embodiment as show in FIG. 4 except for the following aspect. According to the reference intersection selection process of the second embodiment, in the determination as to whether a selected node is a reference node or not (step S304 in FIG. 4), any selected node which has previously been determined as a reference node is determined not to be a reference node. This is in order to prevent an already determined reference node from being again determined as a reference node in the second and subsequent run of step S703 (i.e., performed after step S704).

Next to step S703, the information processing section 4 determines whether all reference intersections have been selected or not (step S704). The determination of step S704 is made based on whether all intersections on the predicted road that is displayed on the display device have been subjected to reference intersection determination. If all reference intersections have not been selected yet, the information processing section 4 repeats the processes of steps S703 and S704. On the other hand, if all reference intersections have been selected, the information processing section 4 performs a facility information acquisition process (step S705). Hereinafter, the details of the facility information acquisition process according to the second embodiment will be described with reference to FIG. 14.

Figure 14:
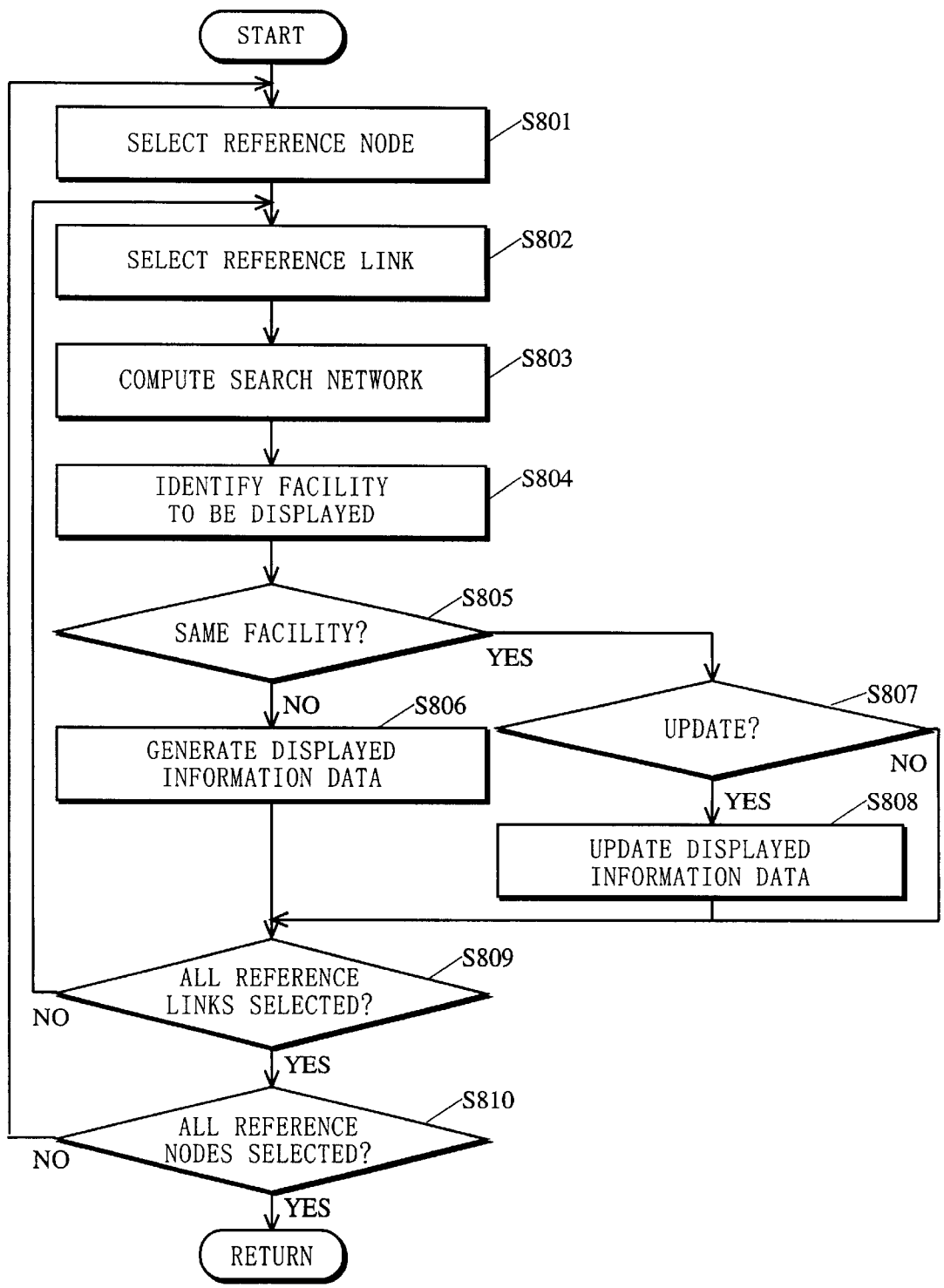
FIG. 14 is a flowchart illustrating the details of step S705 in FIG. 13.

FIG. 14 is a flowchart illustrating the details of step S705 in FIG. 13. First, the information processing section 4 selects one of the reference nodes having been selected at steps S703 and S704 (step S801). Next, the information processing section 4 selects one of the reference links connected to the reference node selected at step S801 (step S802). As defined in connection with step S401 of the first embodiment, a "reference link" is any link connected to a reference node that does not extend toward the current location. In the following description, the reference link selected at step S802 will be referred to as a "selected link".

Next, the information processing section 4 computes a search network containing the selected link (step S803). Step S803 is identical to step S402 in the first embodiment, so that search network data as shown in FIG. 7 is generated at step S803.

Next, based on the search network data computed at step S803, the information processing section 4 searches for facilities, and identifies those facilities to be displayed which match the facility type to be displayed as identified at step S701 (step S804). A plurality of facilities to be displayed may be identified at steps S803 and S804. Specifically, the identification of such facilities is made by storing the selected link determined at the previous step S802 and facility IDs in association with each other.

Next, the information processing section 4 determines whether or not there is any facility(s) which is identical to the facility(s) to be displayed as identified at step S804 (step S805). Specifically, the information processing section 4 determines whether any facility ID stored in step S804 has already been stored in a previous run of step S804 or not. If such a facility ID is found, the information processing section 4 determines that a facility which is identical to a facility to be displayed as identified at step S804 exists. If no such facility ID is found, the information processing section 4 determines that no facility which is identical to a facility to be displayed as identified at step S804 exists.

If step S805 finds that no facility which is identical to a facility to be displayed as identified at step S804 exists, the information processing section 4 generates displayed information data for the facility to be displayed (step S806) Step S806 is identical to step S403 in the first embodiment, so that displayed information data as shown in FIG. 8 (the first embodiment) is generated at step S806.

On the other hand, if step S805 finds that a facility which is identical to a facility to be displayed as identified at step S804 exists, the information processing section 4 determines whether or not to update the already-generated displayed information data (step S807). Note that, if a facility which is identical to a facility to be displayed as identified at step S804 exits, it means that the displayed information data for that facility to be displayed has already been generated in (a previous run of) step S806, that is, the same facility information has been redundantly identified for a number of reference roads. In this case, the determination at step S807 as to whether or not to update the already-generated displayed information data is made based on whether the reference road which is associated with the redundantly-identified same facility information (i.e., the reference road represented by the selected link determined at step S802) satisfies a predetermined condition based on the search network. In the second embodiment, the determination as to whether the predetermined condition is satisfied or not is made based on the distance information contained in the displayed information data. Hereinafter, the determination process of step S807 will be described in detail.

First, based on the search network data computed at the previous step S803, the information processing section 4 computes the distance from the current location to the facility to be displayed. In other words, the distance of a path from the current location to the facility to be displayed which contains the reference road represented by the selected link determined at step S802 is computed. Next, the information processing section 4 compares the computed distance against the distance indicated by the distance information in the already-generated displayed information data. If the result of the comparison shows that the computed distance is greater, the information processing section 4 determines not to update the displayed information data. On the other hand, if the computed distance is found smaller, the information processing section 4 determines to update the displayed information data. By performing the above process every time a facility to be displayed is redundantly identified at step S804, the finally-obtained displayed information data will indicate a reference road contained in a path which constitutes the smallest distance from the current location.

In the second embodiment, the predetermined condition for determining which reference road is to be associated with a given facility to bed is played at step S807 is a condition concerning path distances. In other embodiments, however, other conditions may be employed. For example, a condition concerning estimated travel times for paths may be employed, such that a given facility to be displayed is associated only with a reference road which constitutes a path which imposes the shortest estimated travel time.

Alternatively, as the predetermined condition at step S807, a condition concerning a history of roads stored in the history storage section 5 may be examined based on the relationship between the search network and the history of roads stored in the history storage section 5, such that a given facility to be displayed is associated only with reference roads included in the history of roads stored in history the storage section 5.

Furthermore, the predetermined condition at step S807 may be a condition concerning facility information other than the distance information. For example, if the facility type to be displayed is "restaurants", the information processing section 4 may acquire parking lot information representing the absence/presence of a parking lot as facility information concerning restaurants, and determine whether a predetermined condition is satisfied or not based on such parking lot information. Specifically, the predetermined condition at step S807 may stipulate a facility whose parking lot information indicates the presence of a parking lot and whose distance information indicates the smallest distance. Examples of facility information which may be utilized for the determination of step S807 include the aforementioned parking lot information, information concerning how crowded the shop is, and information indicating that a special sale is going on. The facility information may be externally acquired via the communication section 3, as necessary, when making the determination of step S807. Thus by utilizing facility information for the determination of step S807, it becomes possible to display facility information which matches the needs of the user. For example, while a distance information-oriented determination might attract the user to a restaurant that is closest to the current location, the user may further rely on the parking lot information displayed as facility information to realize that the restaurant has no parking lot, thereby determining not to visit that restaurant.

If it is determined at step S807 that the displayed information data is to be updated, the information processing section 4 updates the displayed information data (step S808), and proceeds to step S809. At step S808, the information processing section 4 again generates displayed information data based on the search network data generated at the previous step S803. On the other hand, if it is determined at step S807 that the displayed information data is not to be updated, the information processing section 4 skips the process of step S808 to proceed to step S809.

Next, the information processing section 4 determines whether or not all of the reference links connected to the reference node selected at step S801 have been selected at step S802 (step S809). If any one of such reference links has not been selected yet, the information processing section 4 returns to step S802 and repeats the processes from steps S802 to S809. On the other hand, if all such reference links have been selected, the information processing section 4 determines whether or not all of the nodes that have been determined as reference nodes have been selected at step S801 (step S810). If any one of such reference nodes has not been selected yet, the information processing section 4 returns to step S801 and repeats the processes from steps S801 to S810. On the other hand, if all such reference nodes have been selected, the information processing section 4 ends the facility information acquisition process at step S705.

Referring back to FIG. 13, next to step S705, the information processing section 4 generates facility information image data based on the displayed information data generated at step S705 (step S706), and ends the process of step S104. Step S706 is identical to step S205 in the first embodiment.

Referring back to FIG. 12, next to step S606, the information processing section 4 performs the processes of steps S607 and S608. Step S607 is identical to step S105 in FIG. 2 and step S608 is identical to step S106 in FIG. 2, and the detailed descriptions thereof are omitted.

Figure 15:
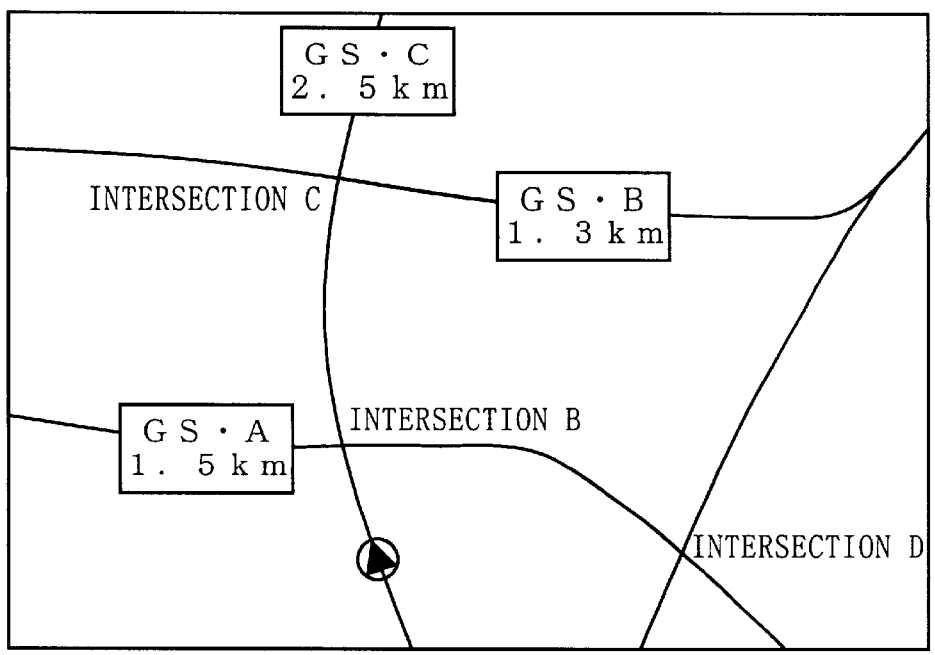
FIG. 15 shows an exemplary image displayed by the navigation apparatus according to the second embodiment.

FIG. 15 shows an exemplary image displayed by the navigation apparatus according to the second embodiment, where the following is assumed. The facility type to be displayed is set to be "gas stations (GS)". The content to be displayed as facility information is the name of each gas station and the distance thereof from the current location. The reference nodes are nodes representing intersections B and C. Note that the letters "intersection B", "intersection C", and "intersection D" will not be displayed on the actual screen, as in the case of FIG. 10.

Now, FIGS. 11 and 15 are compared. In FIG. 11, facility information concerning gas station B (GS·B) is displayed on both the road between intersection B and intersection D, the road between intersection B and intersection C. On the other hand, in FIG. 15, facility information concerning gas station B(GS·B) is displayed on the road extending from intersection C toward the right on the screen. In the second embodiment, if the same facility is identified for a number of roads as the facility to be displayed, the facility information concerning that facility is displayed on only the road which constitutes the smallest distance from the current location, as realized by the method of update at steps S807 and S808 in FIG. 14 which updates the displayed information data toward the smallest distance. In other words, facility information is updated toward the reference link and reference node that constitutes the smallest distance from the current location, so that the link which is stored as the displayed information data will represent a road which constitutes the smallest distance from the current location. The displayed position information is also updated so as to correspond to the updated reference link. Thus, the information concerning gas station B is displayed on the aforementioned road, which constitutes the smallest distance from the current location, and not displayed on any other roads.

Although gas station C(GS·C) is not shown in FIG. 11, facility information concerning gas station C is shown in FIG. 15. This is as a result of selecting intersection C as a reference intersection in addition to intersection B (assuming that gas station C is not within the network of roads to be searched when intersection B is the reference intersection). Thus, by selecting a plurality of reference intersections, it is possible to display more pieces of facility information on the display device.

Figure 16:
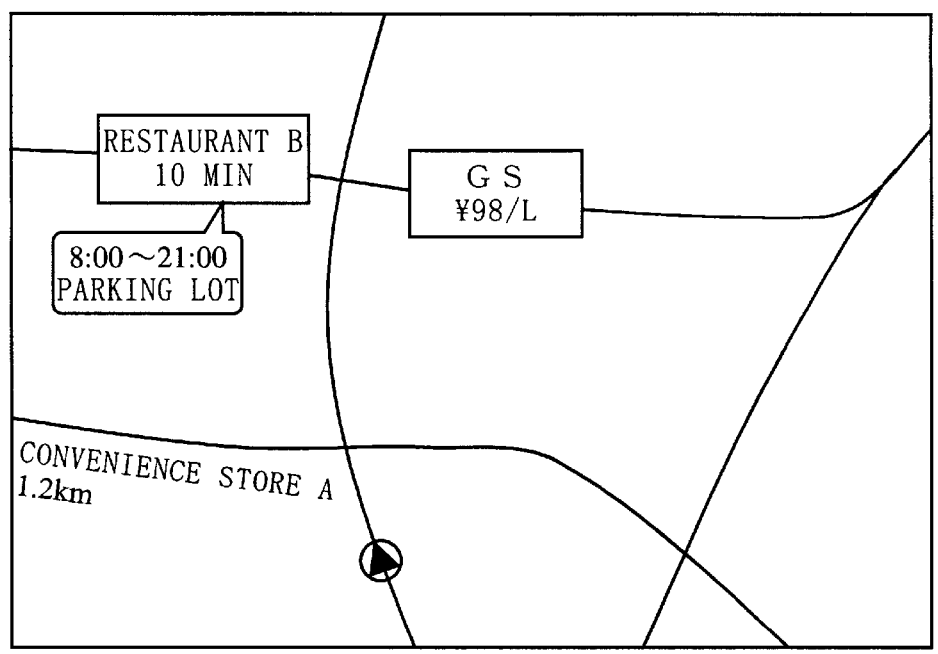
FIG. 16 shows an exemplary image displayed by the navigation apparatus in another embodiment.

The facility information may be displayed in any shape which appears associated with reference roads. FIGS. 16 to 21 are diagrams illustrating an exemplary image displayed by the navigation apparatus according to another embodiment. In another embodiment, facility information may be displayed for a plurality of types of facilities as shown in FIG. 16. Moreover, different shapes may be employed for different types of facilities. Moreover, the facility information may be displayed alongside the road, as in the facility information for a convenience store shown in FIG. 16 ("convenience store A 1.2 km" as shown in FIG. 16). In the example shown in FIG. 16, if latest information is obtained from outside of the vehicle via the communication section 3, the information acquired via the communication section 3 is displayed in a different shape from the other types of information ("8:00 to 21:00 parking lot" as shown in FIG. 16). Information whose content varies over time, such as the information acquired via the communication section 3, may be displayed in a different shape from those used for fixed (i.e., not varying over time) information which is obtained from the map data.

Figure 17:
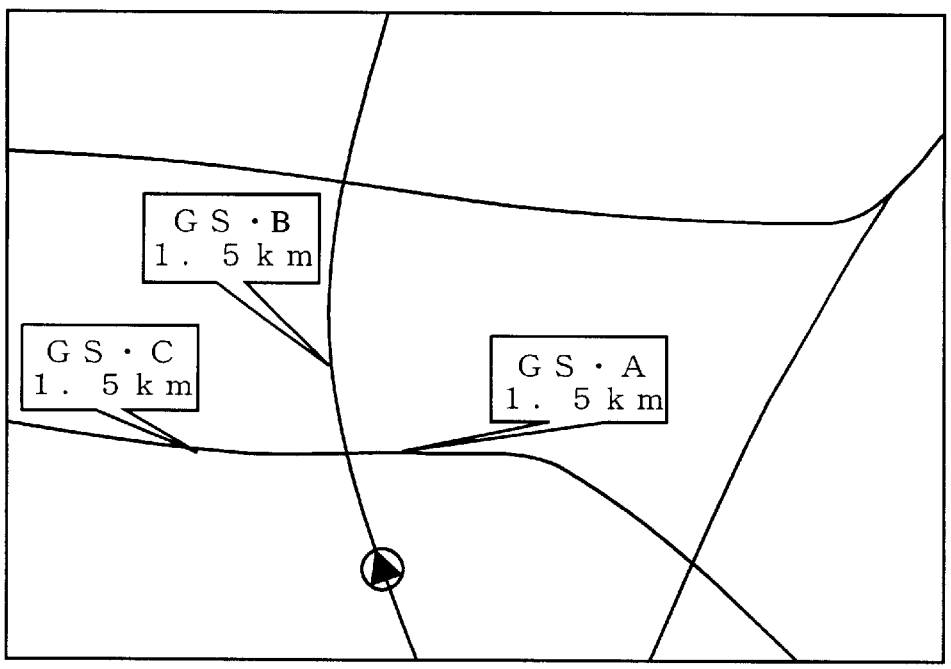
FIG. 17 shows an exemplary image displayed by the navigation apparatus in still another embodiment.
Figure 18:
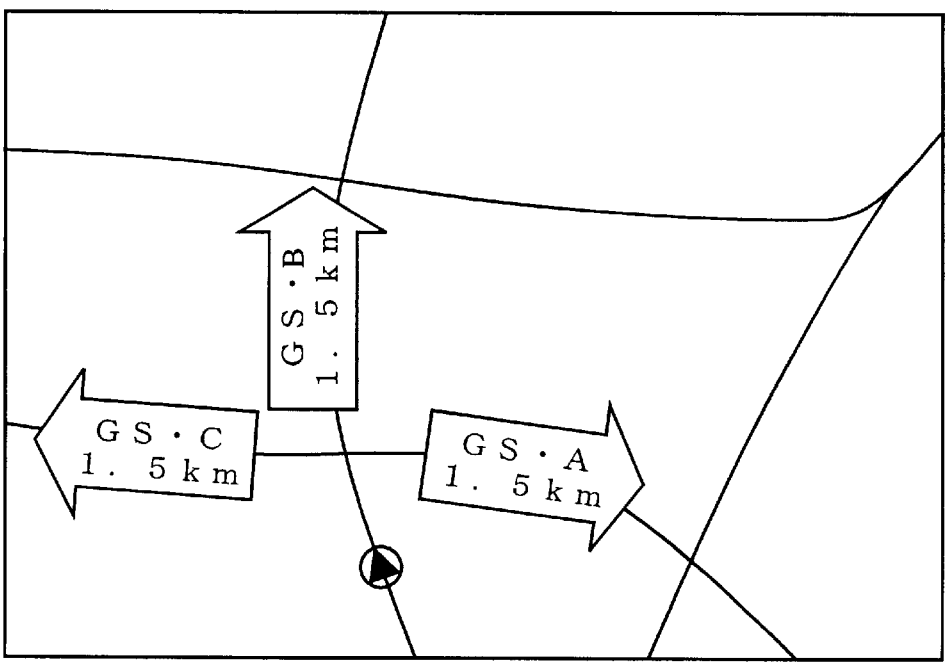
FIG. 18 shows an exemplary image displayed by the navigation apparatus in still another embodiment.
Figure 19:
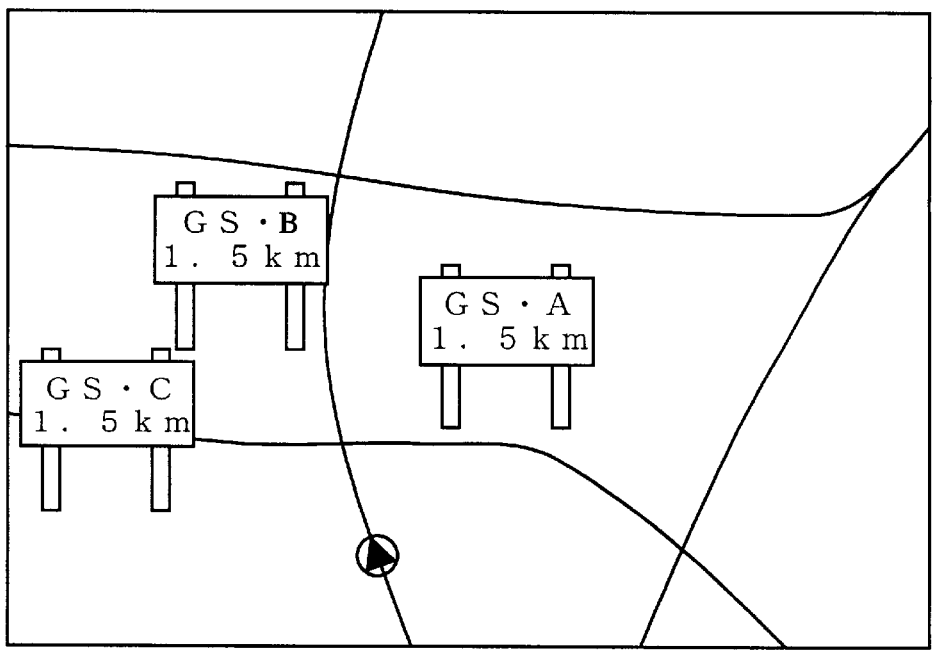
FIG. 19 shows an exemplary image displayed by the navigation apparatus in still another embodiment.
Figure 20:
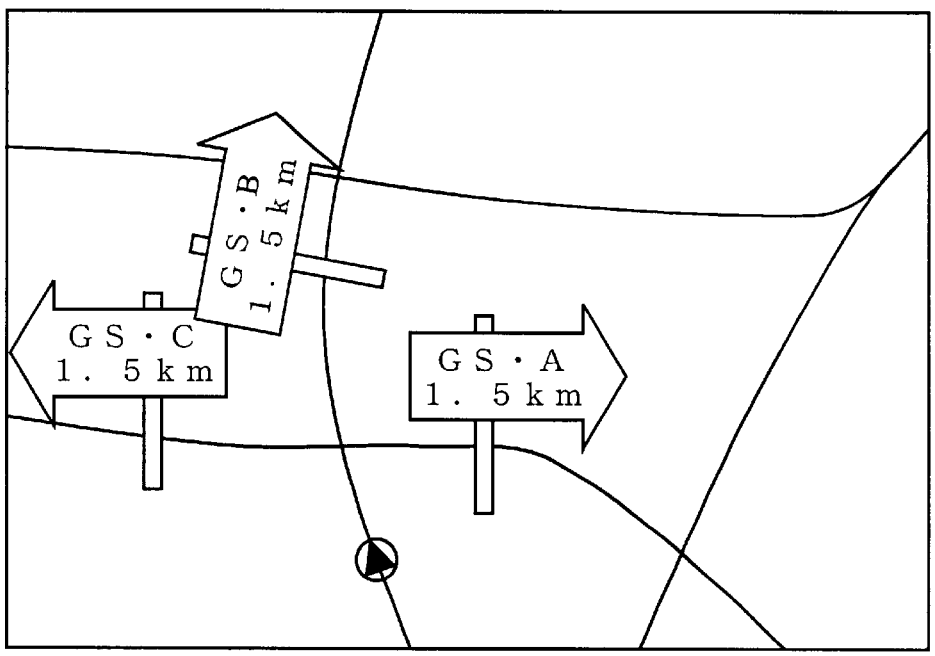
FIG. 20 shows an exemplary image displayed by the navigation apparatus in still another embodiment.
Figure 21:
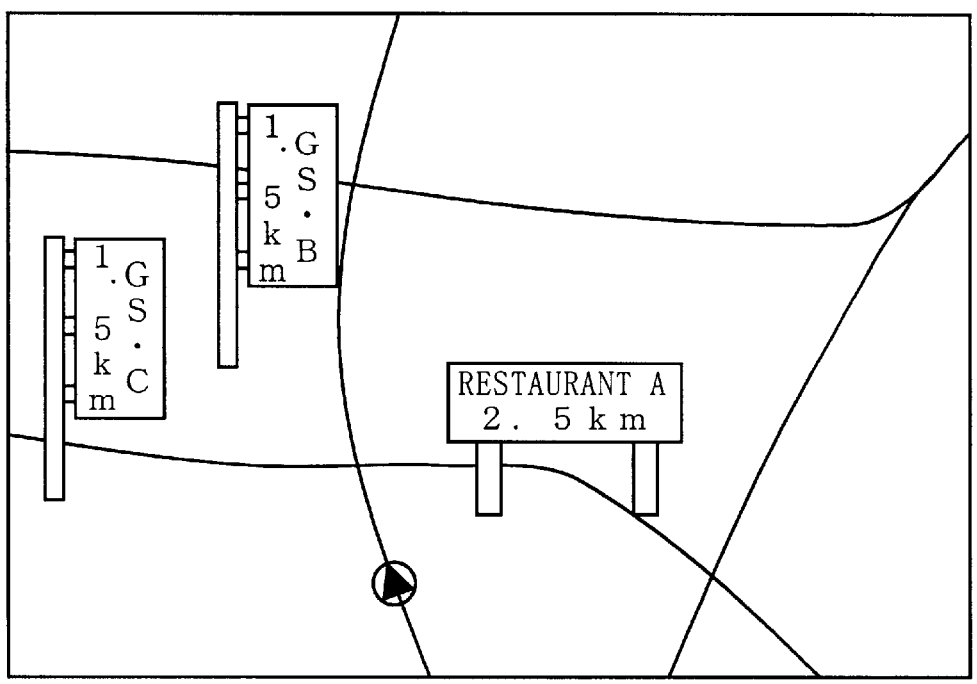
FIG. 21 shows an exemplary image displayed by the navigation apparatus in still another embodiment.
Figure 22:
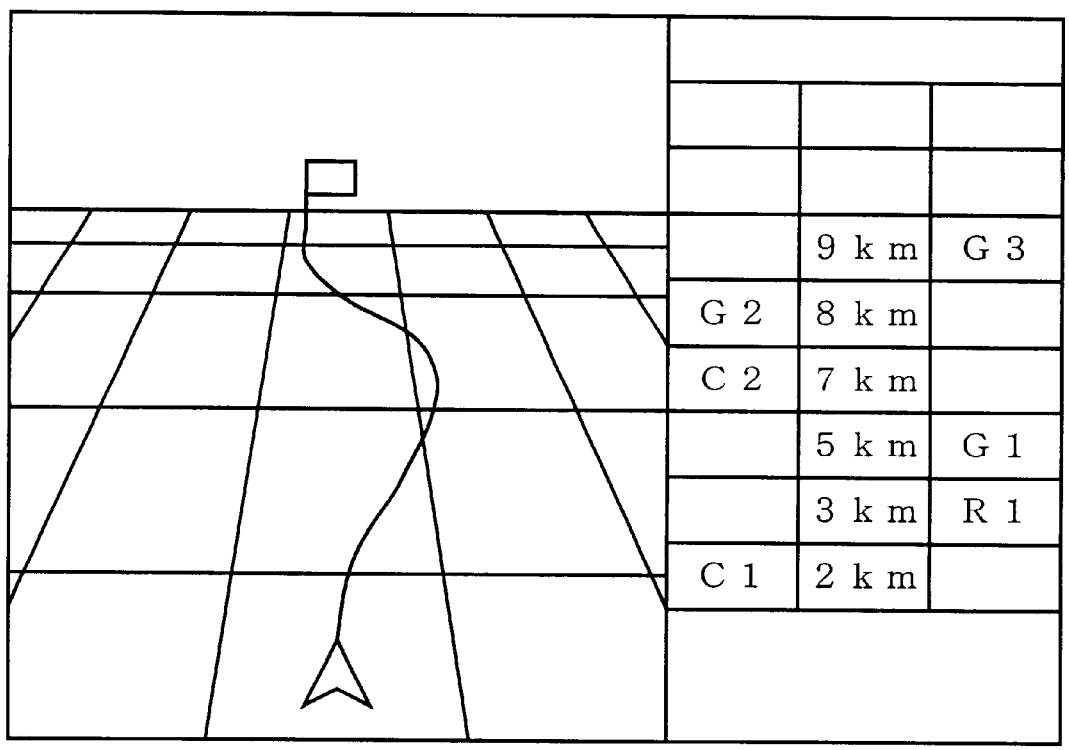
FIG. 22 shows an exemplary image displayed by a conventional navigation system.

Furthermore, the following shapes may be used for displaying facility information. For example, as shown in FIG. 17, facility information may be displayed in the form of balloons associated with reference roads. As a result, facility information may be displayed in places which do not interfere with other objects on the road map. Thus, the displayed position of the facility information does not need to be exactly on the associated reference road; any shape can be used so long as it appears associated with the corresponding reference road. As shown in FIG. 18, facility information may be displayed in arrow-like shapes. By orienting the arrow shape in the opposite direction of the reference intersection (i.e., in the traveling direction of the user), the direction of each facility can be better shown. Furthermore, the facility information may be displayed in the shape of signboards as shown in FIG. 19, or arrow-like signboards as shown in FIG. 20. As shown in FIG. 21, facility information concerning gas stations may be displayed in the shape of actual signboards used at gas stations, while using a different shape for restaurants.

While the invention has been described in detail, the foregoing description is in all aspects illustrative and not restrictive. It is understood that numerous other modifications and variations can be devised without departing from the scope of the invention.

What is claimed is:

1. A navigation apparatus for displaying a road map on a screen of a display device, comprising:
   a map data storage section for storing map data including point information concerning points on the map;
   a moving state acquisition section for acquiring a location and a traveling direction of a user;
   a reference intersection selection section for selecting, from among intersections displayed on the screen, at least one intersection included in a network of roads extending from the location of the user in the traveling direction as a reference intersection;
   a point information acquisition section for acquiring, from the map data storage section, point information concerning a point near a road in a network of roads extending beyond a reference road as seen from the reference intersection, wherein the reference road is a road which is connected to the reference intersection but does not extend toward the location of the user from the reference intersection; and
   a map displaying section for displaying the road map, and displaying the point information acquired by the point information acquisition section so as to appear associated with the reference road associated with the point information.

2. The navigation apparatus according to claim 1, further comprising a network computation section for computing a search network, wherein the search network is the network of roads extending beyond the reference road as seen from the reference intersection,
   wherein, the point information acquisition section acquires point information concerning a point near a road in the search network as the point information associated with the reference road.

3. The navigation apparatus according to claim 2, wherein the network computation section selects only a predetermined category of roads in the map data for the search network.

4. The navigation apparatus according to claim 2, wherein,
   the point information acquisition section comprises a condition checking section for determining, if point information is redundantly acquired as a result of acquiring point information associated with a plurality of said reference roads, whether or not each of the plurality of reference roads associated with the point information which has been redundantly acquired satisfies a predetermined condition based on the search network, and
   the map displaying section displays the point information redundantly acquired by the point information acquisition section so as to appear associated with those reference roads which are determined by the condition checking section as satisfying the predetermined condition.

5. The navigation apparatus according to claim 4, wherein,
   the predetermined condition is a condition concerning the distance of a path from the reference intersection to a point represented by the point information via the reference road, and
   the condition checking section determines, by computing the distance with respect to each of the plurality of reference roads using the search network, whether each of the plurality of reference roads satisfies the predetermined condition or not.

6. The navigation apparatus according to claim 4, wherein,
   the predetermined condition is a condition concerning an estimated travel time for a path from the reference intersection to the point represented by the point information via the reference road, and
   the condition checking section determines, by computing the estimated travel time for each of the plurality of reference roads using the search network, whether each of the plurality of reference roads satisfies the predetermined condition or not.

7. The navigation apparatus according to claim 4, further comprising a road history storage section for storing a history of roads traveled along in the past, wherein,
   the predetermined condition is a condition concerning the history of roads, and
   the condition checking section determines whether each of the plurality of said reference roads satisfies the predetermined condition, based on a relationship between the search network and history of roads stored in the road history storage section.

8. The navigation apparatus according to claim 1, wherein,
   the map data storage section stores map data in which each piece of the point information is associated with a road near the point corresponding to the piece of the point information, and
   the point information acquisition section acquires the point information associated with the road in the map data as the point information concerning the point near the road.

9. The navigation apparatus according to claim 1, wherein,
   the map data storage section stores map data including location information of the points, and
   the point information acquisition section acquires point information concerning a point such that the distance between one of the roads in the search network and the point is equal to or less than a predetermined distance as the point information concerning the point near the road.

10. The navigation apparatus according to claim 1, further comprising a predicted road determination section for determining a predicted road from among the roads displayed on the screen, the predicted road being a road which the user is expected to travel along,
    wherein the reference intersection selection section selects the reference intersection from among intersections on the predicted road.

11. The navigation apparatus according to claim 10, wherein the predicted road determination section determines a route from a start point to a destination as the predicted road.

12. The navigation apparatus according to claim 10, wherein, based on the location and the traveling direction of the user, the predicted road determination section determines a road which lies in the traveling direction of the user and belongs to a predetermined road category as the predicted road.

13. The navigation apparatus according to claim 10, wherein, based on the location and the traveling direction of the user, the reference intersection selection section determines an intersection on the predicted road that is closest to the location of the user as the reference intersection.

14. The navigation apparatus according to claim 10, wherein the reference intersection selection section selects as the reference intersection an intersection which is on the predicted road and at which a road belonging to a predetermined category connects to the predicted road.

15. The navigation apparatus according to claim 10, further comprising a road history storage section for storing a history of roads traveled along in the past,
   wherein, based on the history of roads stored in the road history storage section, the reference intersection selection section selects as the reference intersection an intersection which is on the predicted road and at which a road stored in the road history storage section connects to the predicted road.

16. The navigation apparatus according to claim 1, wherein the point information acquisition section acquires, from among the point information included in the map data, only a predetermined type of point information.

17. The navigation apparatus according to claim 1, wherein the point information is facility information concerning facilities.

18. The navigation apparatus according to claim 1, wherein the point information is place name information representing names of places.

19. The navigation apparatus according to claim 1, wherein the map displaying section displays the point information in an arrow shape oriented in an opposite direction from the reference intersection.

20. The navigation apparatus according to claim 1, wherein the point information acquisition section acquires a plurality of pieces of point information of different types, and
   the map displaying section displays the point information in different shapes depending on the types of point information.

21. A point information displaying method for displaying point information on a road map displayed on a screen of a display device, comprising the steps of:
   selecting, from among intersections displayed on the screen, at least one intersection included in a network of roads extending from a location of a user in a traveling direction of the user as a reference intersection,
   designating, as a reference road, a road which is connected to the reference intersection but does not extend toward the location of the user from the reference intersection; and
   displaying point information concerning a point near a road in a network of roads extending beyond the reference road as seen from the reference intersection so as to appear associated with the reference road.

22. A program for causing a computer to display a road map on a screen of a display device,
   wherein the computer stores map data including point information concerning points on the map, the method comprising:
   a moving state acquisition step of acquiring a location and a traveling direction of a user;
   a reference intersection selection step of selecting, from among intersections displayed on the screen, at least one intersection included in a network of roads extending from the location of the user in the traveling direction as a reference intersection;
   a point information acquisition step of acquiring, from the map, point information concerning a point near a road in a network of roads extending beyond a reference road as seen from the reference intersection, wherein the reference road is a road which is connected to the reference intersection but does not extend toward the location of the user from the reference intersection; and
   a map displaying step of displaying the road map on the display device, and displaying the point information acquired by the point information acquisition step so as to appear associated with the reference road associated with the point information.

23. A computer-readable recording medium on which the program according to claim 22 is recorded.

* * * * *